(12) United States Patent
Wright et al.

(10) Patent No.: US 8,323,602 B2
(45) Date of Patent: Dec. 4, 2012

(54) TREATMENT OF FLUE GAS FROM AN OXYFUEL COMBUSTION PROCESS

(75) Inventors: Andrew David Wright, Guildford (GB); Vincent White, Ashtead (GB); Timothy Christopher Golden, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 115 days.

(21) Appl. No.: 12/832,156

(22) Filed: Jul. 8, 2010

(65) Prior Publication Data
US 2012/0009109 A1   Jan. 12, 2012

(51) Int. Cl.
| | | |
|---|---|---|
| B01D 53/14 | (2006.01) | |
| B01D 53/56 | (2006.01) | |
| C01B 31/00 | (2006.01) | |
| D01F 9/12 | (2006.01) | |
| C01D 3/00 | (2006.01) | |

(52) U.S. Cl. ..... 423/220; 423/219; 423/247; 423/415.1; 423/447.6; 423/449.5

(58) Field of Classification Search .......... None
See application file for complete search history.

(56) References Cited

U.S. PATENT DOCUMENTS

| | | | |
|---|---|---|---|
| 5,260,043 | A | 11/1993 | Li et al. |
| 6,747,066 | B2 | 6/2004 | Wang et al. |
| 7,416,716 | B2 | 8/2008 | Allam et al. |
| 7,597,865 | B2 | 10/2009 | Mori et al. |
| 2003/0153632 | A1 | 8/2003 | Wang et al. |
| 2007/0049492 | A1 * | 3/2007 | Miyairi et al. ........ 502/439 |
| 2007/0137187 | A1 * | 6/2007 | Kumar ................. 60/299 |
| 2008/0038174 | A1 | 2/2008 | Mori et al. |
| 2008/0173584 | A1 | 7/2008 | White et al. |
| 2008/0173585 | A1 | 7/2008 | White et al. |

(Continued)

FOREIGN PATENT DOCUMENTS

| | | |
|---|---|---|
| EP | 411655 | 6/1934 |
| EP | 998771 | 7/1965 |
| EP | 1952874 | * 8/2008 |
| GB | 2442444 | 9/2008 |

OTHER PUBLICATIONS

Counce, R. M.; "A Literature Review of Nitrogen Oxide Absorption Into Water and Dilute Nitric Acid;" sponsored by an agency of the US Govenment. Aug. 1977.

(Continued)

*Primary Examiner* — Melvin C Mayes
*Assistant Examiner* — Sheng H Davis
(74) *Attorney, Agent, or Firm* — Willard Jones, II; Eric J. Schaal

(57) ABSTRACT

Carbon monoxide (CO) may be removed from flue gas generated by oxyfuel combustion of a hydrocarbon or carbonaceous fuel, by contacting the flue gas, or a CO-containing gas derived therefrom, at a first elevated temperature, e.g. at least 80° C., and at a first elevated pressure, e.g. at least 2 bar (0.2 MPa), with at least one catalyst bed comprising a CO-oxidation catalyst in the presence of oxygen ($O_2$) to convert CO to carbon dioxide and produce carbon dioxide-enriched gas. The carbon dioxide produced from the CO may be recovered from the carbon dioxide-enriched gas using conventional carbon dioxide recovery techniques. NO in the flue gas may also be oxidized to nitrogen dioxide ($NO_2$) and removed using conventional $NO_2$ removal techniques, or may be reduced in the presence of a reducing gas to nitrogen ($N_2$) which does not have to be removed from the gas.

22 Claims, 5 Drawing Sheets

U.S. PATENT DOCUMENTS

2008/0176174 A1     7/2008    White et al.
2010/0024476 A1*   2/2010    Shah ............................. 62/617
2011/0223083 A1     9/2011    Bialkowski et al.

OTHER PUBLICATIONS

Dillon, et at; "Oxy-Combustion Processes for CO2 Capture from Advanced Supercritical PF and NGCC Power Plant;" presented at GHGT-7 Vancouver, Sep. 2004.

Jordal; et al; "Oxyfuel Combustion for Coal-Fired Power Generation with CO2 Capture-Opportunities and Challenges;" GHGT-7 Vancouver, 2004.

Spassova, et al; "Coprecipitated CuO-MnOx Catalysts for Low-Temperature CO-NO and CO-NO-O2 Reactions" Journal of Catalysis 185 (1999); p. 43-57.

Petrocelli, et al; U.S. Appl. No. 12/832,096, filed Jul. 8, 2010; "Integration of Catalytic CO2 Oxidation and Oxyfuel Sour Compression."

Petrocellli, et al; U.S. Appl. No. 12/832,204, filed Jul. 8, 2010; "Sorbent Use with Oxyfuel Sour Compression".

White et al; U.S. Appl. No. 12/832,095, filed Jul. 8, 2010; "Handling of Acids from Compressed Oxyfuel-Derived CO2."

Wright, et al; U.S. Appl. No. 12/832,117, filed Jul. 8, 2010; "Recycle TSA Regen Gas to Boiler for Oxyfuel Operations."

Diamond, Barry Wayne; U.S. Appl. No. 12/832,120; filed Jul. 8, 2010; "Removal of Acid Mists".

* cited by examiner

TREATMENT OF FLUE GAS FROM AN OXYFUEL COMBUSTION PROCESS

BACKGROUND OF THE INVENTION

The present invention relates primarily to a method for removing carbon monoxide (CO) from flue gas generated by oxyfuel combustion of a fuel such as a hydrocarbon fuel; a carbonaceous fuel; or biomass. The method may also be used to remove nitric oxide (NO) from the flue gas. The invention has particular application in the processing of flue gas from an oxyfuel combustion process in a pulverized coal fired power station.

The term "$SO_x$" means oxides of sulfur and includes sulfur dioxide ($SO_2$) and sulfur trioxide ($SO_3$). The term "$NO_x$" means oxides of nitrogen and includes primarily NO and nitrogen dioxide ($NO_2$). $NO_x$ may comprise one or more other oxides of nitrogen including $N_2O$, $N_2O_4$ and $N_2O_3$.

It has been asserted that one of the main causes of global warming is the rise in greenhouse gas contamination in the atmosphere due to anthropological effects. The main greenhouse gas which is being emitted, carbon dioxide ($CO_2$), has risen in concentration in the atmosphere from 270 ppm before the industrial revolution to the current figure of about 378 ppm. Further rises in $CO_2$ concentration are inevitable until $CO_2$ emissions are curbed. The main sources of $CO_2$ emission are fossil fuel fired electric power stations and from petroleum fueled vehicles.

The use of fossil fuels is necessary in order to continue to produce the quantities of electric power that nations require to sustain their economies and lifestyles. There is, therefore, a need to devise efficient means by which $CO_2$ may be captured from power stations burning fossil fuel so that it can be stored rather than being vented into the atmosphere. Storage may be deep undersea; in a geological formation such as a saline aquifer; or a depleted oil or natural gas formation. Alternatively, the $CO_2$ could be used for enhanced oil recovery (EOR).

The oxyfuel combustion process seeks to mitigate the harmful effects of $CO_2$ emissions by producing a net combustion product gas consisting of $CO_2$ and water vapor by combusting a carbonaceous or hydrocarbon fuel in pure oxygen. This process would result in an absence of nitrogen ($N_2$) in the flue gas, together with a very high combustion temperature which would not be practical in a furnace or boiler. In order to moderate the combustion temperature, part of the total flue gas stream is typically recycled, usually after cooling, back to the burner.

An oxyfuel process for $CO_2$ capture from a pulverized coal-fired power boiler is described in a paper entitled "*Oxy-combustion processes for $CO_2$ capture from advanced supercritical PF and NGCC power plants*" (Dillon et al; presented at GHGT-7, Vancouver, September 2004), the disclosure of which is incorporated herein by reference.

Oxyfuel combustion produces raw flue gas containing primarily $CO_2$, together with contaminants such as water vapor; CO; "non-condensable" gases, i.e. gases from chemical processes which are not easily condensed by cooling, such as excess combustion oxygen ($O_2$), and/or $O_2$, $N_2$ and argon (Ar) derived from any air leakage into the system; and acid gases such as $SO_3$, $SO_2$, hydrogen chloride (HCl), NO and $NO_2$ produced as oxidation products from components in the fuel or by combination of $N_2$ and $O_2$ at high temperature. The precise concentrations of the gaseous impurities present in the flue gas depend on factors such as on the fuel composition; the levels of $O_2$ and $N_2$ in the combustor; the combustion temperature; and the design of the burner and furnace.

In general, the final, purified, $CO_2$ product should ideally be produced as a high pressure fluid stream for delivery into a pipeline for transportation to storage or to site of use, e.g. in EOR. The $CO_2$ must be dry to avoid corrosion of, for example, a carbon steel pipeline. The $CO_2$ impurity levels must not jeopardize the integrity of the geological storage site, particularly if the $CO_2$ is to be used for EOR, and the transportation and storage must not infringe international and national treaties and regulations governing the transport and disposal of gas streams.

It is, therefore, necessary to purify the raw flue gas from the boiler or furnace to remove water vapor; CO; $SO_x$; $NO_x$; soluble gaseous impurities such as HCl; and "non-condensable" gases such as $O_2$, $N_2$ and Ar, in order to produce a final $CO_2$ product which will be suitable for storage or use. It is also necessary to reduce and ideally eliminate emission of impurities such as CO, $NO_x$ and $SO_x$ into the atmosphere.

In general, the prior art in the area of $CO_2$ capture using the oxyfuel process has up to now concentrated on removal of $SO_x$ and $NO_x$ upstream of the $CO_2$ compression train in a $CO_2$ recovery and purification system, using current state of the art technology. $SO_x$ and $NO_x$ removal is based on flue gas desulphurization (FGD) schemes such as scrubbing with limestone slurry followed by air oxidation producing gypsum, and $NO_x$ reduction using a variety of techniques such as low $NO_x$ burners, over firing or using reducing agents such as ammonia or urea at elevated temperature with or without catalysts. Conventional $SO_x/NO_x$ removal using desulphurization and $NO_x$ reduction technologies is disclosed in "*Oxyfuel Combustion For Coal-Fired Power Generation With $CO_2$ Capture—Opportunities And Challenges*" (Jordal et al; GHGT-7, Vancouver, 2004). Such process could be applied to conventional coal boilers.

US 2007/0122328 A1 (granted as U.S. Pat. No. 7,416,716 B1) discloses the first known method of removing $SO_2$ and $NO_x$ from crude carbon dioxide gas produced by oxyfuel combustion of a hydrocarbon or carbonaceous fuel, in which the removal steps take place in the $CO_2$ compression train of a $CO_2$ recovery and purification system. This process is known as a "sour compression" process since acid gases are compressed with carbon dioxide flue gas. The method comprises maintaining the crude carbon dioxide gas at elevated pressure(s) in the presence of $O_2$ and water and, when $SO_2$ is to be removed, $NO_x$, for a sufficient time to convert $SO_2$ to sulfuric acid and/or $NO_x$ to nitric acid; and separating said sulfuric acid and/or nitric acid from the crude carbon dioxide gas.

It is also known generally to oxidize CO and NO to $CO_2$ and $NO_2$ respectively using a range of catalysts. For example, GB 998,771 describes the use of "hopcalite", a mixture of copper oxide and manganese oxide, for oxidizing CO to carbon dioxide (and hydrogen ($H_2$) to water) at 5 to 10 psig (140 to 179 kPa) and 240° C. in a process for the purification of helium. $CO_2$ is then removed using molecular sieves.

US 2003/0153632 A1 describes processes for removing $O_2$ from synthesis gas ("syngas") by passing the syngas over a catalyst based on metal/metal oxides at a pressure from atmospheric pressure to about 1000 psi (6.9 MPa) or higher and at a temperature of 20 to 600° C. The catalyst facilitates oxidation of CO in the syngas to carbon dioxide using $O_2$ in the syngas.

The use of catalysis for reducing emissions of CO and NO from different forms of air-fired combustion has also been described. For example, GB 411,655 describes the use of a noble metal catalyst (platinum and rhodium) or hopcalite for the oxidation of carbon black and CO to clean the exhaust gas from an internal combustion engine. In addition, GB 2,442, 444 A describes the use of hopcalite for also oxidizing NO in exhaust gases. The reaction takes place at atmospheric pressure and at a temperature of 30 to 86° C. It discloses that the humidity of the exhaust gases should be from 0.035 to 0.9 kg/kg dry gas.

Spassova et al (Journal of Catalysis; 185; 43-57; 1999) describe the use of hopcalite catalysts for the simultaneous oxidation of CO and reduction of NO at ambient temperature.

Other catalysts for the reduction of NO to $N_2$ are known and are typically referred to as selective catalytic reduction ("SCR") catalysts. For example, U.S. Pat. No. 5,260,043 A describes a process for the conversion of $NO_x$ and CO to $N_2$ and $CO_2$ respectively in flue gas containing $O_2$, using a metal-exchanged crystalline zeolite catalyst and $CH_4$ as a reducing agent. The reaction takes place at 250 to 700° C. and at 0.5 to 300 atm. (50 kPa to 30 MPa). Ammonia ($NH_3$) has also been used as a reducing gas with SCR catalysts.

US 2008/0038174 A1 teaches a two bed system for SCR of $NO_x$. The first catalyst bed contains a mixed metal oxide and the second bed contains a supported noble metal catalyst. The reference indicates that the catalyst system may be used to remove nitrogen oxide within an exhaust gas generated upon combustion of fuels such as diesel, gasoline, coal and the like. Tests of the catalyst system were carried out on a reaction gas containing 10% $O_2$, 150 ppm each of NO and $NO_2$, 5% water, and $N_2$ for the remainder, and on the exhaust from a 5 L-NA engine.

There is a continuing need to develop new methods and apparatus for removing CO, preferably together with $SO_x$ and $NO_x$, from flue gas generated by oxyfuel combustion of fuels, and thereby reduce not only the emission concentration, but preferably also the total amount, of these impurities released into the atmosphere, particularly on an industrial scale.

BRIEF SUMMARY OF THE INVENTION

It is an object of the present invention to provide a method and apparatus for removing CO from flue gas generated by oxyfuel combustion of a fuel, particularly on an industrial scale.

It is a further object of the present invention to provide a method and apparatus for reducing not only the emission concentration of CO, but also the total amount of CO, released into the atmosphere from such flue gas.

It is an object of preferred embodiments of the present invention to provide a method and apparatus that also removes NO from such flue gas, preferably to reduce not only the emission concentration of this impurity, but also the total amount of this impurity released into the atmosphere.

It is another object of preferred embodiments of the present invention to provide a method and apparatus that is either compatible with existing $NO_2$ removal technologies, or that reduces or eliminates the need to remove $NO_2$.

It is a further object of preferred embodiments of the present invention to provide a method and apparatus that is compatible with existing carbon dioxide capture technologies.

It is a yet further object of preferred embodiments of the present invention to provide a method and apparatus that is compatible with existing $SO_x$ removal technologies.

According to a first aspect of the present invention, there is provided a method for removing CO from flue gas comprising carbon dioxide, CO and at least one non-condensable gas, said method comprising:

generating said flue gas by oxyfuel combustion of a fuel in an oxyfuel combustion system; and contacting said flue gas, or a CO-containing gas derived therefrom, at a first elevated temperature and at a first elevated pressure, with at least one catalyst bed comprising a CO-oxidation catalyst in the presence of $O_2$ to convert CO to carbon dioxide and produce carbon dioxide-enriched gas comprising at least a portion of said condensable gas(es).

The present invention removes at least a significant quantity of CO present in a flue gas generated by oxyfuel combustion of a fuel, and reduces not only the emission concentration of CO, but also the total amount of CO that is vented to the atmosphere. One advantage of the present invention is that, in preferred embodiments, the method and apparatus also removes at least a significant quantity NO from the flue gas, either by conversion to $NO_2$ (which may be removed using existing $NO_2$ technologies), or by conversion to $N_2$ which can be released into the atmosphere without limitation thereby avoiding the need for $NO_2$ removal technology. Preferred embodiments of the present invention are also compatible with, and may therefore be integrated with, existing carbon dioxide recovery and/or $SO_x$ removal technologies.

According to a second aspect of the present invention, there is provided apparatus for removing CO from flue gas comprising carbon dioxide, CO and at least one non-condensable gas, said apparatus comprising:

an oxyfuel combustion system for generating said flue gas by oxyfuel combustion of a fuel; and a pressurizable catalytic reactor system comprising at least one catalyst bed comprising a CO-oxidation catalyst, for converting CO from said flue gas in the presence of $O_2$ at a first elevated temperature and at a first elevated pressure to carbon dioxide, to produce carbon dioxide-enriched gas comprising at least a portion of said non-condensable gas(es).

DETAILED DESCRIPTION OF THE INVENTION

Figure 1:
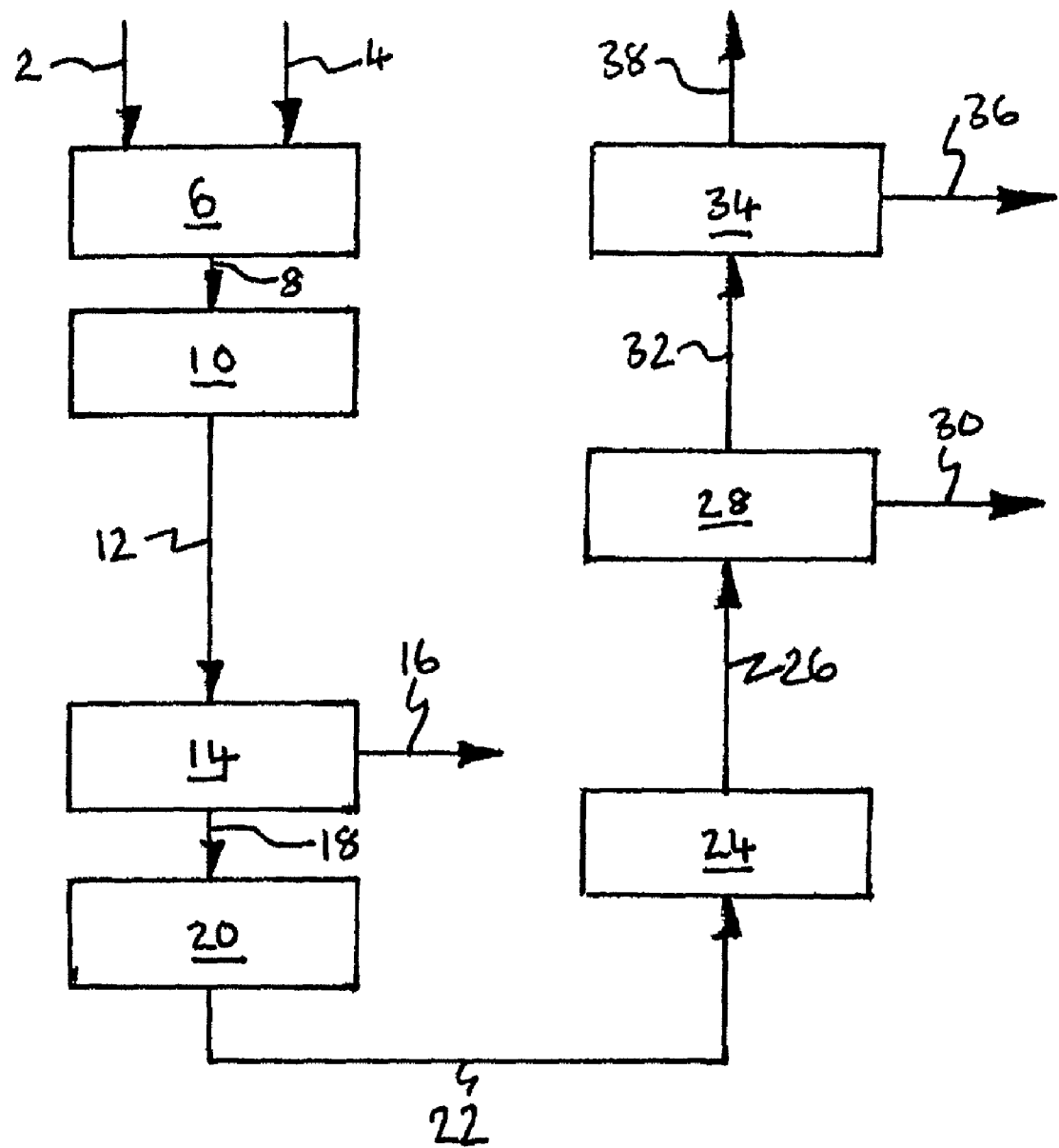
FIG. 1 is a simplified flow sheet depicting one embodiment of the present invention.

The method comprises generating the flue gas by oxyfuel combustion of a fuel in an oxyfuel combustion system; and contacting the flue gas, or a CO-containing gas derived therefrom, at a first elevated temperature and at a first elevated pressure, with at least one catalyst bed comprising a CO-oxidation catalyst in the presence of $O_2$ to convert CO to carbon dioxide and produce carbon dioxide-enriched gas comprising at least a portion of the non-condensable gas(es) from the flue gas.

It should be noted that the percentages indicated for the various components in gas streams discussed below are approximate molar percentages (mol. %) calculated on a dry basis. In addition, all pressures discussed throughout the specification are absolute pressures and not gauge pressures, unless otherwise stated.

Oxyfuel combustion involves the combustion of a fuel, usually selected from the group consisting of hydrocarbons, carbonaceous fuels, and biomass, in an $O_2$-rich gas. Suitable hydrocarbon fuels include natural gas; and $C_1$ to $C_6$ hydrocarbons such as methane and ethane. Suitable carbonaceous fuels include coal such as lignite, sub-bituminous coal, bituminous coal and anthracite. The invention has particular application where the fuel is a sulfur-containing carbonaceous fuel such as pulverized coal.

The $O_2$-rich gas is a gas having a higher concentration of $O_2$ than air, e.g. more than about 21% $O_2$, and preferably at least 80% $O_2$. The use of pure $O_2$, e.g. at least 95% $O_2$ is preferred. The presence of such high quantities of $O_2$ raises the combustion temperature, potentially to excessive levels. Thus, a significant portion, e.g. from about 60% to about 80%, of flue gas produced from the combustion process is typically recycled to the oxyfuel combustion system to moderate the temperature of combustion and control heat flux. Thus, the flue gas to be treated by the present method is usually from about 20% to about 40% of the total flue gas leaving in the oxyfuel combustion system.

The invention has particular application in treating large volumes of flue gas generated in industrial combustion processes such as in combustion processes involved in boilers for power generation. The flow rate of the flue gas to be treated by the present invention is typically from about 200 kmol/h to about 40,000 kmol/h.

Flue gas generated in an oxyfuel combustion process is a "crude" carbon dioxide gas, usually comprising from about 40% to about 90% carbon dioxide, e.g. from about 60% to about 90% carbon dioxide, or from about 65% to about 85% carbon dioxide. The CO-containing gas derived from the flue gas usually comprises a lower concentration of carbon dioxide than the flue gas. Typically, the CO-containing gas contains from about 20% to about 40% carbon dioxide.

In addition to carbon dioxide, the flue gas comprises CO resulting from incomplete or partial combustion in the oxyfuel combustion system. The CO concentration in the flue gas depends upon a number of factors, particularly how the combustion system is operated. For example, the higher the excess $O_2$ used, the lower the outlet CO concentration. The amount of CO contaminant in the flue gas is usually more than about 50 ppm but no more than about 10,000 ppm, and is typically from about 100 ppm to about 5,000 ppm.

The flue gas comprises at least one non-condensable gas, i.e. a gas from a chemical process which is not easily condensed by cooling. The non-condensable gases are usually selected from the group consisting of $O_2$; $N_2$; Ar; rare gases such as krypton (Kr) and xenon (Xe); and mixtures thereof. Typically, all of these gases are present in the flue gas. $O_2$ is typically present in the flue gas from excess $O_2$ used in the combustion process, and from air ingress into the combustion system which is also responsible for the presence of $N_2$, Ar, Kr and Xe in the flue gas.

The flue gas usually contains at least sufficient $O_2$ required for all of the relevant oxidation reactions discussed herein, and usually contains an excess of $O_2$. In this connection, $O_2$ is typically present in an amount from about 0.1% to about 15%, e.g. from about 1% to about 8%, of the flue gas. Since the rate of oxidation increases with oxygen concentration, the flue gas preferably contains at least 1% $O_2$, more preferably at least 3% $O_2$, and most preferably at least 5% $O_2$. Where there is insufficient $O_2$ in the flue gas (or no $O_2$ at all), $O_2$ may be added to the flue gas from an external source.

Where present in the flue gas, $N_2$ is typically present in an amount from about 5% to about 30% of the flue gas; Ar is typically present in an amount from about 0.1% to about 10% of the flue gas; Kr is typically present in an amount from about 0.5 ppm to about 1.5 ppm; and Xe is typically present in an amount from about 30 ppb to about 150 ppb.

The flue gas also usually comprises $NO_x$ produced by reaction of $N_2$ and/or nitrogen-containing compounds in the fuel, with $O_2$ in the combustion system. Where present in the flue gas, $NO_x$ is typically present in an amount of more than 100 ppm but no more than 10,000 ppm, e.g. from about 500 ppm to about 3,000 ppm. The majority of the $NO_x$ is usually NO with $NO_2$ being the second most abundant component of $NO_x$. The $NO_x$ may include other oxides of nitrogen such as $N_2O$, $N_2O_4$ and $N_2O_3$, but these oxides are usually in smaller quantities than $NO_2$.

The flue gas also usually comprises $SO_x$ produced by the combustion of elemental sulfur and/or sulfur-containing compounds present in the fuel. Where present in the flue gas, $SO_2$ is typically present in an amount of more than about 50 ppm but no more than about 10,000 ppm, e.g. from about 100 ppm to about 5,000 ppm.

Water is also usually present in the flue gas. The amount of water present depends on a number of factors including not only on the composition of the fuel and combustion conditions, but also whether and, if so, the extent to which, the flue gas is cooled by washing in water prior to compression. In this case, the amount of water present will depend on the saturated vapor pressure at the conditions to the inlet of the compression system. As a general guide, the amount of water is usually from about 0.1% to about 30% of the flue gas. For example, at about 1 bar (0.1 MPa), a 10° C. feed to the compressor provides about 1.2% water, a 20° C. to 40° C. feed would give from about 2% to 8% water, and a 60° C. feed would give about 20% water.

The flue gas fed to the pressurizable catalytic reactor system, or the CO-containing gas derived therefrom, typically comprises, in addition to carbon dioxide, from about 1 to about 40% $O_2$; up to about 2,000 ppm NO; from about 10 to about 1,000 ppm CO; and no more than about 100 ppm $SO_x$.

Further components of the flue gas are typically include one, some or all of the following components (depending primarily on the content of the fuel and the combustion conditions): solid particulates such as fly ash and soot; hydrogen chloride (HCl); hydrogen fluoride (HF); carbon disulfide ($CS_2$); hydrogen disulfide ($H_2S$); hydrogen cyanide (HCN); volatile organic compounds (VOCs) such as trichloromethane ($CHCl_3$); metals including mercury, arsenic, iron, nickel, tin, lead, cadmium, vanadium, molybdenum and selenium; and compounds of these metals. A further advantage of preferred embodiments of the present invention is that the CO oxidation catalyst may also be useful in the oxidation of other species present in the flue gas such as mercury, HCN, arsine ($ArH_3$), and other impurities.

Raw flue gas from the combustion system is typically washed with water to remove solid particulates and water soluble components (such as HCl, HF and/or $SO_3$). Additionally, the flue gas may be filtered, using equipment such as a baghouse or electrostatic precipitator, to enhance particulate removal. Since the flue gas is typically at atmospheric pressure, it is then compressed after washing to the first elevated pressure.

At this stage, at least a portion of any $NO_x$ present in the flue gas may be removed by SCR to produce $N_2$. Additionally or alternatively, $SO_2$ may be removed from the flue gas using a conventional FGD scheme such as scrubbing with limestone slurry, or other alkaline sorbent, to produce sorbent-derived sulfite, followed by air oxidation to produce the sulfate, e.g. gypsum.

Flue gas may be compressed in a compression system having a single stage or more than one stages, with or without interstage cooling using heat exchangers. If interstage cooling is used, then means (e.g. "knockout" pots) may be provided to capture and remove any condensate that is formed during the compression step(s). However, if the flue gas originates from a source, such as a pressurized oxyfuel combustion system, that is already at the required first elevated pressure, then compression is not required.

The term "elevated pressure" is intended to mean a pressure that is significantly greater than atmospheric pressure. For example, the term is intended to exclude minor elevations in pressure over atmospheric pressure, such as those elevations provided by a blower or fan in order to force a gas through apparatus operating at about atmospheric pressure. Such minor pressure elevations are considered to be insignificant in the context of the present invention.

The first elevated pressure is usually at least 2 bar (0.2 MPa), e.g. at least 3 bar (0.3 MPa), preferably at least 5 bar (0.5 MPa), and more preferably at least 20 bar (2 MPa). The elevated pressure is usually no more than about 100 bar (10 MPa) and preferably no more than about 50 bar (5 MPa). The elevated pressure may be from about 3 bar to about 50 bar (0.3 MPa to 5 MPa), e.g. from about 5 bar to about 50 bar (0.5 MPa to 5 MPa), or from about 20 bar to about 50 bar (1 MPa to 4 MPa).

The term "elevated temperature" is intended to mean a temperature that is significantly greater than ambient temperature. The American Society of Testing and Materials (ASTM) defines ambient temperature as from 50° F. to 100° F., i.e. from about 10° C. to about 38° C.

The first elevated temperature is usually at least about 80° C., and is preferably at least about 120° C. The first elevated temperature is usually no more than about 800° C., e.g. no more than 350° C. In embodiments in which NO is also oxidized to $NO_2$, the first elevated temperature is preferably from about 120° C. to about 300° C., e.g. from about 140° C. to about 200° C. It should be noted that CO oxidation is enhanced at higher temperature, while NO oxidation has a faster rate at lower temperature. Therefore, in embodiments in which both CO and NO are being oxidized, an optimum temperature for the oxidation of both CO and NO may be obtained. If the NO is to be removed by catalytic reduction, then higher temperatures are generally preferred. Thus, in embodiments in which NO is also reduced to $N_2$, the first elevated temperature is preferably from about 100° C. to about 700° C., e.g. from about 100° C. to about 200° C.

The temperature of the flue gas after compression may range from ambient to about 500° C. If the gas is compressed in multiple stages, then the extent to which the gas is intercooled may be calculated and carefully controlled so as to provide the feed gas not only at the required elevated pressure but also at the desired reaction temperature so that any additional post-compression heating or cooling of the gas is minimized or even eliminated entirely.

Alternatively, the temperature of the flue gas, or the CO-containing gas derived therefrom, may be adjusted as required after compression. For example, the gas may be cooled to the desired reaction temperature by indirect heat exchange with a coolant, e.g. cooling water, or the gas may be heated to the desired reaction temperature by indirect heat exchange with a heat transfer fluid, e.g. steam. At least part of the heat required to raise the temperature of the gas to the first elevated temperature may be generated by compression of the gas. Any remaining heating duty can be provided (a) by indirect heat exchange (i) with another fluid undergoing sensible heat change, (ii) with another stream undergoing latent heat change including condensing steam, or (b) by using an electric heater, or using any combination of (a)(i), (a)(ii) and (b). In this connection, flue gas may be heated by steam and/or boiler feed water, e.g. the power plant running the oxyfuel combustion system. Heat may also be recovered from the carbon dioxide-enriched gas by indirect heat exchange with the flue gas, or said CO-containing gas derived therefrom, as feed to said catalyst bed(s).

The CO-oxidation catalyst is preferably present in an amount sufficient to oxidize at least 50%, e.g. at least 75%, or at least 90%, of the CO in the flue gas at a given flow rate and at the first elevated temperature and pressure.

The CO-oxidation catalyst may be a mixed metal oxide wherein the metals are selected from the group consisting of copper; manganese; iron; cobalt; silver; nickel; and cerium. A preferred mixed metal oxide is hopcalite. The CO-oxidation catalyst may be based on noble metals, e.g. platinum or palladium, preferably impregnated on a suitable support such as alumina; zinc oxide; silica; zeolite; titania; and zirconia. The CO-oxidation catalyst may include various permanganate salts, e.g. silver permanganate and potassium permanganate, impregnated on a suitable support such as alumina; zinc oxide; silica; zeolite; titania; and zirconia. The CO-oxidation catalyst may be a mixture of a mixed metal oxide and a noble metal, with or without a permanganate salt.

Carbon dioxide may be strongly adsorbed on the surface of the catalyst and may retard the oxidation reactions. Therefore, catalysts with low carbon dioxide capacity and which do not easily form carbonates are preferred. These catalysts include copper oxide, titanium oxide and vanadium oxide.

Water is a poison for the CO-oxidation catalysts of interest and, thus, the relative humidity of the gas is usually less than about 10%. By reducing the inlet challenge of water, the reaction rate is increased.

$SO_x$ will also deactivate most of the CO-oxidation catalysts of interest. Therefore, in preferred embodiments, where the flue gas comprises $SO_x$, the method comprising removing $SO_x$ from the flue gas prior to contacting the flue gas, or the CO-containing gas derived therefrom, with the catalyst bed(s). In this connection, $SO_3$ may be removed by washing the raw flue gas from the combustion system. In addition, at least some, preferably at least substantially all, of the $SO_2$ may be removed, together with any $SO_3$, in a FGD process such as scrubbing with an alkaline sorbent material.

In some embodiments, $SO_2$ is converted to sulfuric acid condensate by contacting the flue gas with at least one solid $SO_2$-oxidation catalyst in the presence of $O_2$ to convert $SO_2$ to $SO_3$ which may be condensed in the presence of water to form sulfuric acid condensate and $SO_2$-depleted flue gas. The oxidation reaction preferably takes place at elevated pressure, e.g. from about 5 bar to about 50 bar (0.5 MPa to 5 MPa), and at an elevated temperature, e.g. from about 300° C. to about 700° C. Once oxidized, the gas is typically cooled to a temperature from ambient temperature to below the acid dew point, in the presence of water to prompt formation of the acid condensate.

The "acid dew point" is a conventional term in the art referring to the temperature at which reaction conditions favor production of sulfuric acid as a liquid from the gas phase equilibrium reaction of $SO_3$ and water. The acid dew point is dependent on pressure and the concentration of other components such as $SO_3$ (and $NO_x$), and a higher pressure (or a lower concentration of the other component(s)) means a higher dew point. Table 1 provides some examples from the literature (Oil & Gas Journal; Vol. 108; Issue 7; 22 Feb. 2010) of how acid dew point varies with pressure and $SO_3$ concentration.

TABLE 1

| Pressure (atm.) | Dew point (° C.) 5% H$_2$O, 5000 ppm SO$_3$ | Dew point (° C.) 20% H$_2$O, 5000 ppm SO$_3$ |
| --- | --- | --- |
| 1 | 194 | 204 |
| 10 | 233 | 242 |
| 30 | 250 | 259 |

The temperature to which the gas is cooled may be from about 20° C. to about 150° C., e.g. from about 25° C. to about 100° C., and preferably from about 30° C. to about 50° C. Further details of this method are provided in co-pending U.S. patent application Ser. No. 12/832,096 which may be identified by APCI Docket No. 07409 USA, the disclosure of which is incorporated herein by reference.

In preferred embodiments, however, SO$_2$ is converted to sulfuric acid condensate by maintaining the flue gas at elevated pressure(s) in the presence of O$_2$, water and NO$_x$, in a "sour gas" reactor system for a period of time sufficient to convert SO$_2$ to sulfuric acid condensate. If NO$_x$ is not already present in the feed gas as a further contaminant, then NO$_x$ may be added to the gas upstream of the sour gas reactor system. The amount of NO$_x$ to be added may be from about 100 ppm to about 10,000 ppm, e.g. about 500 ppm to about 3,000 ppm. However, as indicated above, the invention has particular application in methods for purifying flue gas comprising both SO$_x$ and NO$_x$, so additional NO$_x$ is unlikely to be required.

Sulfuric acid (and nitric acid) is formed according to the following series of reactions which are referred to herein as "sour compression" or "sour gas" reactions:

(i) $2NO+O_2 \leftrightarrows 2NO_2$
(ii) $2NO_2+H_2O \leftrightarrows HNO_2+HNO_3$
(iii) $3HNO_2 \leftrightarrows HNO_3+2NO+H_2O$
(iv) $NO_2+SO_2 \leftrightarrows NO+SO_3$
(v) $SO_3+H_2O \leftrightarrows H_2SO_4$ Following extensive studies (Counce, R. M. (1977), "*A literature review of nitrogen oxide absorption into water and dilute nitric acid*", Technical Report ORNL/TM-5921, Oak Ridge National Laboratory), it has been determined that the rate of reaction (i) is increased as the reaction pressure increases. The Inventors realized that carrying out the present method at elevated pressure improves the rate of reaction (i).

The elevated pressure(s) for the sour compression reactions is usually at least about 3 bar (0.3 MPa) e.g. at least about 5 bar (0.5 MPa). The elevated pressure is usually no more than 100 bar (10 MPa), and preferably no more than 50 bar (5 MPa). In preferred embodiments, the elevated pressure is from about 5 bar to about 50 bar (0.5 MPa to 5 MPa). Where a sour compression reactor system is used to remove SO$_2$, upstream of the pressurizable catalytic reactor system, the elevated pressure is preferably from about 10 bar (2 MPa) to about 20 bar (2 MPa). Where a sour compression system is used to remove NO$_2$, downstream of the pressurizable catalytic reactor system, the elevated pressure is preferably from about 25 bar (2.5 MPa) to about 35 bar (3.5 MPa), and more preferably this elevated pressure is the first elevated pressure, subject to any inherent pressure drop in the apparatus.

The temperature at which the sour compression reactions take place in a sour gas reactor system may be from ambient temperature to below the acid dew point. For example, the temperature may be from about 20° C. to about 150° C., e.g. from about 25° C. to about 100° C., or from about 30° C. to about 50° C.

The or each sour gas reactor system simply provides a sufficient volume for a given flow rate within which the reactions may take place at elevated pressure(s). A sour gas reactor system usually comprises a pressurizable reactor vessel such as a pipe or duct; a tank; an absorption column; a wet scrubbing tower; fluidized or moving bed; packed tower or column; and a Venturi scrubber. Where a sour gas reactor system comprises a countercurrent gas/liquid contact column, acid condensate may be removed from the bottom of the column, pumped, cooled and fed as reflux to the top of the column.

Residence time in a sour gas reactor system (i.e. contact time or "hold up" time) determines the degree or extent of the sour compression reactions. In this connection, the period of time required for converting NO$_x$ to nitric acid is typically longer than that required for converting SO$_2$ to sulfuric acid. This period of time is usually no more than 1000 s, and preferably no more than 600 s. This period of time is usually more than 5 s, e.g. more than 10 s or more than 20 s. The period of time may be from 5 s to about 600 s, e.g. from about 10 s to about 500 s or from about 15 s to about 200 s. It should be noted that, whilst the sour compression reactions begin as soon as the pressure and temperature conditions allow, the reactions typically progress to a significant extent only after about 5 s, and usually only after about 10 s or even 20 s.

Further details of the sour compression reactions themselves and of methods incorporating the reactions to remove SO$_x$ and/or NO$_x$ from flue gas, are provided in US 2007/0122328 A1, the disclosure of which is incorporated herein by reference.

It should be noted that, even with an initial SO$_2$ removal step, the CO-oxidation catalysts may still degrade over time. For example, sulfur compounds may still build up over time, and carbonates may be formed on a metal oxide catalyst. Therefore, the catalyst may need to be regenerated periodically.

The method preferably comprises recovering carbon dioxide from the carbon dioxide-enriched gas, or from a carbon dioxide-containing gas derived therefrom, to produce recovered carbon dioxide and carbon dioxide-depleted gas comprising at least a portion of said non-condensable gas(es). Carbon dioxide may be recovered by a process selected from the group consisting of low temperature carbon dioxide purification; membrane separation; and any combination thereof.

The expression "low temperature carbon dioxide purification process" is intended to refer to those processes that purify crude carbon dioxide (e.g. from about 40% to 90% carbon dioxide) or impure carbon dioxide (e.g. from about 90% to about 95% carbon dioxide) to produce at least substantially pure carbon dioxide (e.g. >95% carbon dioxide) as a liquid. The liquid carbon dioxide may then be used to provide refrigeration for the low temperature purification process (after suitable pressure reduction), pressurized to pipeline pressure from about 80 bar (8 MPa) to about 250 bar (25 MPa) and then may be stored in geological formations or in deep sea locations, or may be used in EOR processes.

The processes involve condensation or liquefaction of carbon dioxide and, thus, take place at temperature below 0° C. Suitable processes include distillation and/or partial condensation and separation. Since the gas has to be cooled to the low temperature, the gas is dried in a desiccant dryer to remove water which would otherwise freeze out of the gas. Such processes usually take place at an elevated pressure, and preferably at the first elevated pressure to avoid the need for any additional compression.

In some preferred embodiments, the carbon dioxide-enriched gas, or the carbon dioxide-containing gas derived therefrom, is purified by cooling and partially condensing the gas to produce liquid carbon dioxide and a vapor phase containing carbon dioxide and the bulk of the non-condensable gases. The liquid carbon dioxide and the vapor phase are then separated in a phase separator. The vapor phase may be cooled and partially condensed to recover further liquid carbon dioxide. This process allows the carbon dioxide loss with the vent stream to be minimized by fixing the gas pressure at an appropriate level, e.g. from about 20 bar (2 MPa) to about 40 bar (2 MPa to 4 MPa). The present invention may be integrated with the partial condensation and membrane combination disclosed in US 2008/0176174 A, or the partial condensation and distillation combination disclosed in US 2008/0173585 A, the disclosures of which are incorporated herein by reference.

At least a portion of the carbon dioxide may be recovered from the carbon dioxide-enriched gas, or from the carbon dioxide-containing gas derived therefrom, by membrane separation. These methods comprise separating the carbon dioxide-enriched gas, or the carbon dioxide-containing gas derived therefrom, in a membrane separation system into a carbon dioxide-rich permeate fraction and a non-condensable gas(es)-enriched retentate fraction; and recycling the carbon dioxide-rich permeate fraction, or a carbon dioxide-rich gas derived therefrom, to the oxyfuel combustion system. The carbon dioxide-rich permeate fraction may be used to regenerate at least one adsorbent bed prior to being recycled to the oxyfuel combustion system. The adsorbent bed(s) is typically part of an integrated low temperature carbon dioxide purification system.

The carbon dioxide-enriched gas, or the carbon dioxide-containing gas derived therefrom, usually comprises $O_2$ and/or $NO_x$. If present, these gases will also be recycled to the oxyfuel combustion system in the carbon dioxide-rich permeate fraction. Where $O_2$ is recycled, these embodiments have the advantage of reducing size of a front end $O_2$ generator such as a cryogenic ASU.

The flue gas, or the CO-containing gas derived therefrom, usually comprises NO. In preferred embodiments, the catalyst bed(s) oxidizes NO to $NO_2$ in the presence of $O_2$ and the carbon dioxide-enriched gas is thereby also being enriched with $NO_2$. The Inventors note that the NO oxidation step is second order in NO and first order in $O_2$ in the gas phase. Thus, higher elevated pressures should increase the reaction rate in these embodiments.

$NO_2$ may be removed from the carbon dioxide-enriched gas, or from a $NO_2$-containing gas derived therefrom, by a process selected from the group consisting of adsorption; conversion to nitric acid condensate; membrane separation; distillation; and any combination of two or more of said processes. In embodiments where at least a portion of the $NO_2$ is removed from the carbon dioxide-enriched gas, or from a $NO_2$-containing gas derived therefrom, by adsorption, the method may comprise adsorbing $NO_2$ in at least one adsorbent bed to produce $NO_2$-depleted gas; regenerating the adsorbent bed(s) using a regeneration gas to produce $NO_2$-enriched regeneration gas; and recycling the $NO_2$-enriched regeneration gas to the oxyfuel combustion system.

In preferred embodiments, $NO_2$ is removed by conversion to nitric acid condensate. $NO_2$ is preferably converted to nitric acid condensate by maintaining the carbon dioxide-enriched gas, or the $NO_2$-containing gas derived therefrom, at an elevated pressure in the presence of $O_2$ and water in a sour gas reactor system for a period of time sufficient to convert $NO_2$ to nitric acid condensate via sour compression reactions (i) to (iii) discussed above. The elevated pressure is usually within the range of preferred elevated pressures defined above. However, for convenience, the elevated pressure is preferably the same as the first elevated pressure to minimize overall energy consumption. An advantage of these embodiments is that removal of any elemental mercury or mercury compounds present as further contaminant(s) in the flue gas will be enhanced, since elemental mercury in the vapor phase will be converted to mercuric nitrate and mercury compounds react readily with nitric acid. Typical nitric acid concentrations in these embodiments will be sufficient to remove all of the mercury from the flue gas, either by reaction or dissolution.

In some preferred embodiments, flue gas is contacted with the catalyst bed(s), and CO in the flue gas is converted to carbon dioxide to produce the carbon dioxide-enriched gas. In these embodiments, carbon dioxide is preferably recovered from the carbon dioxide-enriched gas, or from a carbon dioxide-containing gas derived therefrom, by low temperature carbon dioxide purification to produce recovered carbon dioxide as a liquid and carbon dioxide-depleted gas comprising at least a portion of the non-condensable gas(es). Where the flue gas comprises NO, and the catalyst bed(s) oxidizes NO to $NO_2$ to produce carbon dioxide-enriched gas that is enriched with $NO_2$, the method preferably comprising removing $NO_2$ from the carbon dioxide-enriched gas to produce the carbon dioxide-containing gas that is at least lean in $NO_2$. The $NO_x$ is preferably removed from the carbon dioxide-enriched gas in a sour gas reactor system operating at an elevated pressure, preferably with the range of preferred elevated pressures indicated above, and more preferably at about the first elevated pressure, thereby reducing or minimizing overall energy consumption.

In other preferred embodiments, the catalytic oxidation of CO (and NO) may take place on a "tail gas" rather than the bulk of the flue gas. In such embodiments, the bulk of the carbon dioxide recovery is carried out prior to oxidation of CO (and NO). Thus, the method may comprise recovering carbon dioxide from the flue gas by low temperature carbon dioxide purification to produce recovered carbon dioxide as a liquid and the CO-containing gas which is depleted in carbon dioxide. The CO-containing gas is contacted with the catalyst bed(s), and CO in the CO-containing gas is converted to carbon dioxide to produce the carbon dioxide-enriched gas. In these embodiments, the method preferably comprises separating the carbon dioxide-enriched gas in a membrane separation system into a carbon dioxide-rich permeate fraction and a non-condensable gas(es)-enriched retentate fraction; and recycling the carbon dioxide-rich permeate fraction to the oxyfuel combustion system, optionally after being used to regenerate at least one adsorbent bed. Where the carbon dioxide-enriched gas comprises $O_2$, the carbon dioxide-rich permeate fraction is also rich in $O_2$.

Where the CO-containing gas comprises NO, and the catalyst bed(s) oxidizes NO to $NO_2$ to produce carbon dioxide-enriched gas that is enriched with $NO_2$, the method preferably comprises removing $NO_2$ from the carbon dioxide-enriched gas, or from a non-condensable gas(es)-enriched gas derived therefrom that comprises $NO_2$, to produce residual gas that is at least lean in $NO_2$. The $NO_x$ is preferably removed from the carbon dioxide-enriched gas, or from the non-condensable gas(es)-enriched gas derived therefrom, in a sour gas reactor system, preferably operating with the range of preferred elevated pressures indicated above, and more preferably at about the first elevated pressure to minimize overall energy consumption. Residual gas is usually expanded to generate power and vented to the atmosphere.

In further preferred embodiments, the method comprising recovering carbon dioxide from the flue gas by low temperature carbon dioxide purification to produce recovered carbon dioxide as a liquid and a carbon dioxide-lean gas comprising at least a portion of the non-condensable gas(es). The carbon dioxide-lean gas, or a carbon dioxide-depleted gas derived therefrom, is contacted as the CO-containing gas with the catalyst bed(s), and CO in the CO-containing gas is converted to carbon dioxide to produce the carbon dioxide-enriched gas. The carbon dioxide-lean gas is preferably separated in a membrane separation system to produce a carbon dioxide-rich gas and the carbon dioxide-depleted gas.

In these embodiments, the carbon dioxide-enriched gas may be expanded to produce power and vented without further recovery of carbon dioxide. Alternatively, the method may comprise expanding the carbon dioxide-enriched gas to produce power and expanded carbon dioxide-enriched gas; recovering carbon dioxide and, optionally, oxygen from the expanded carbon dioxide-enriched gas to produce recovered carbon dioxide and further carbon dioxide-depleted gas comprising at least a portion of the non-condensable gas(es); and recycling the recovered carbon dioxide to the oxyfuel combustion system. The method may also comprise expanding the further carbon dioxide-depleted gas to produce power and expanded carbon dioxide-depleted gas; and either (i) venting the expanded carbon dioxide depleted gas; or (ii) using the expanded carbon dioxide-depleted gas to regenerate at least one adsorption bed. The further carbon dioxide-depleted gas may be heated prior to expansion.

In these other and further preferred embodiments, it may also be desirable to remove a part of the $NO_x$ present in the flue gas before the carbon dioxide recovery step. In this connection, the $NO_x$ is preferably removed from the flue gas in a further sour gas reactor system, preferably operating within the range of preferred elevated pressures indicated above, and more preferably at about the first elevated pressure to minimize overall energy consumption.

Where the flue gas comprises $NO_x$ as a further contaminant, the method typically removes at least 30%, e.g. at least 40% and, in some embodiments, at least 50%, of the $NO_x$ contaminant. In some embodiments, the method removes from 30% to about 90%, e.g. from about 35% to about 80%, of the $NO_x$ contaminant.

Where the flue gas, or the CO-containing gas derived therefrom, comprises NO and where the catalyst bed(s) reduces NO to $N_2$ in the presence of a reducing gas, the carbon dioxide-enriched gas is thereby also being enriched with $N_2$. Suitable catalysts include standard SCR catalysts such as vanadium oxides, e.g. vanadium pentoxide ($V_2O_5$), and tungsten oxides, e.g. tungsten trioxide ($WO_3$), usually supported on an inert support such as silica, alumina, zirconia and, preferably titania; and zeolites, optionally being ion exchanged with metal ions such as iron and/or copper cations. Particularly suitable catalysts are those catalysts disclosed in U.S. Pat. No. 5,260,043 A and US 2008/0038174 A1, the disclosures of which are incorporated herein by reference. Suitable reducing gases include CO, ammonia ($NH_3$), and methane. An advantage of such embodiments is that there are no emission issues with $N_2$ and removal of $N_2$ from the gas is not necessary prior to venting.

Regarding the second aspect of the present invention, the apparatus comprises an oxyfuel combustion system for generating the flue gas by oxyfuel combustion of a fuel; and a pressurizable catalytic reactor system comprising at least one catalyst bed comprising a CO-oxidation catalyst, for converting CO from the flue gas in the presence of $O_2$ at a first elevated temperature and at a first elevated pressure to carbon dioxide, to produce carbon dioxide-enriched gas comprising at least a portion of said non-condensable gas(es).

The apparatus may comprise a heat exchange system for recovering heat from the carbon dioxide gas by indirect heat exchange with the flue gas, or the CO-containing gas derived therefrom, as feed to the pressurizable catalytic reactor system.

The apparatus usually comprises a carbon dioxide recovery system for recovering carbon dioxide from the carbon dioxide-enriched gas, or from a carbon dioxide-containing gas derived therefrom, to produce recovered carbon dioxide and carbon dioxide-depleted gas comprising at least a portion of the non-condensable gas(es). The carbon dioxide recovery system may be selected from the group consisting of low temperature carbon dioxide purification system; a membrane separation system; and any combination thereof. In embodiments where the carbon dioxide recovery system comprises a membrane separation system, the apparatus usually comprises a conduit arrangement for recycling a carbon dioxide-rich permeate fraction from the membrane separation system to the oxyfuel combustion system, optionally via at least one adsorbent bed.

In some preferred embodiments, the catalyst bed(s) also converts NO to $NO_2$. In other preferred embodiments, the catalyst bed(s) also converts NO to $N_2$ in the presence of a reducing gas.

In embodiments where the catalyst bed(s) also converts NO to $NO_2$, the apparatus usually comprises a $NO_2$ removal system for removing $NO_2$ from the carbon dioxide-enriched gas, or from a $NO_2$-containing gas derived therefrom. The $NO_2$ removal system may be selected from the group consisting of an adsorption system; a sour gas reactor system to convert $NO_2$ to nitric acid condensate; a membrane separation system; and any combination of two or more of said systems.

The apparatus usually further comprising a $SO_x$ removal system for removing $SO_x$ from said flue gas upstream of said pressurizable catalytic reactor system.

The pressurizable catalytic reactor system is typically a catalytic reactor having at least one catalyst bed. Any suitable catalyst bed may be used, including a fixed bed and a fluidized bed, and combinations thereof may also be used. Where the reactor has a single catalyst bed, the catalyst may be designed with an ageing factor so that the unit containing the bed is replaced after an acceptable interval. Where the reactor has two beds in parallel, the reactor may be operated with one bed on-line whilst the other bed is off-line being regenerated. The beds would then be swapped over after regeneration is complete. Alternatively, both beds of the catalytic reactor may be on-line, but with only 50% flow to each bed in order to reduce pressure drop. Both units would be sized to cope with 100% flow so that, when a bed is taken off-line to be regenerated, then the other bed can still achieve the required level of conversion of CO and NO.

Regeneration of the catalysts bed(s) may be carried out at atmospheric pressure with electrical or steam heating being applied either to the outside of the vessel or to the regeneration gas. The regeneration gas exiting a bed may be used to preheat the regeneration gas entering the bed.

The exiting or "spent" regeneration gas may be recycled to the feed end of the bed and a slipstream taken off and vented. In this way, if the equilibrium is favorable for regeneration of the impurities, but the kinetics are slow, then instead of venting a lot of regeneration gas, it is recycled and the buildup of impurities in this regeneration gas is limited by the size of the purge. At the end of regeneration, the catalyst bed is flushed through with fresh regeneration gas and cooled. The regeneration gas may be air; waste gas from an air separation unit ("ASU"); or a slipstream of water/$CO_2$-free air from the ASU.

Aspects of the invention include:

1. A method for removing carbon monoxide (CO) from flue gas comprising carbon dioxide, CO and at least one non-condensable gas, said method comprising:
generating said flue gas by oxyfuel combustion of a fuel in an oxyfuel combustion system; and
contacting said flue gas, or a CO-containing gas derived therefrom, at a first elevated temperature and at a first elevated pressure, with at least one catalyst bed comprising a CO-oxidation catalyst in the presence of oxygen ($O_2$) to convert CO to carbon dioxide and produce carbon dioxide-enriched gas comprising at least a portion of said condensable gas(es).

2. A method according to #1, wherein said first elevated temperature is at least 80° C.

3. A method according to #1 or #2, wherein heat is recovered from said carbon dioxide-enriched gas by indirect heat exchange with said flue gas, or said CO-containing gas derived therefrom, as feed to said catalyst bed(s).

4. A method according to any of #1 to #3, wherein said first elevated pressure is at least 2 bar (0.2 MPa).

5. A method according to any of #1 to #4, wherein said flue gas is generated at a pressure that is lower than said first elevated pressure, said method comprising compressing said flue gas to said first elevated pressure.

6. A method according to any of #1 to #5, said method comprising recovering carbon dioxide from said carbon dioxide-enriched gas, or from a carbon dioxide-containing gas derived therefrom, to produce recovered carbon dioxide and carbon dioxide-depleted gas comprising at least a portion of said non-condensable gas(es).

7. A method according to #6, wherein carbon dioxide is recovered from said carbon dioxide-enriched gas, or from said carbon dioxide-containing gas derived therefrom, by a process selected from the group consisting of low temperature carbon dioxide purification; membrane separation; and any combination thereof.

8. A method according to #6 or #7, wherein at least a portion of said carbon dioxide is recovered from said carbon dioxide-enriched gas, or from said carbon dioxide-containing gas derived therefrom, by membrane separation, said method comprising:
separating said carbon dioxide-enriched gas, or said carbon dioxide-containing gas derived therefrom, in a membrane separation system into a carbon dioxide-rich permeate fraction and a non-condensable gas(es)-enriched retentate fraction; and
recycling said carbon dioxide-rich permeate fraction, or a carbon dioxide-rich gas derived therefrom, to said oxyfuel combustion system.

9. A method according to #8, wherein said carbon dioxide-rich permeate fraction is used to regenerate at least one adsorbent bed prior to being recycled to said oxyfuel combustion system.

10. A method according to #9, wherein said adsorbent bed(s) is part of an integrated low temperature carbon dioxide purification system.

11. A method according to any of #8 to #10, wherein said carbon dioxide-enriched gas, or said carbon dioxide-containing gas derived therefrom, comprises at least one additional gas selected from the group consisting of $O_2$ and $NO_x$, and wherein said carbon dioxide-rich permeate fraction comprises at least a portion of said additional gas(es).

12. A method according to any of #1 to #11, wherein said flue gas, or said CO-containing gas derived therefrom, comprises nitric oxide (NO) and wherein said catalyst bed(s) oxidizes NO to nitrogen dioxide ($NO_2$) in the presence of $O_2$, said carbon dioxide-enriched gas thereby also being enriched with $NO_2$.

13. A method according to #12, wherein $NO_2$ is removed from said carbon dioxide-enriched gas, or from a $NO_2$-containing gas derived therefrom, by a process selected from the group consisting of adsorption; conversion to nitric acid condensate; membrane separation; distillation; and any combination of two or more of said processes.

14. A method according to #12 or #13, wherein at least a portion of said $NO_2$ is removed from said carbon dioxide-enriched gas, or from a $NO_2$-containing gas derived therefrom, by adsorption, said method comprising:
adsorbing $NO_2$ in at least one adsorbent bed to produce $NO_2$-depleted gas;
regenerating said adsorbent bed(s) using a regeneration gas to produce $NO_2$-enriched regeneration gas; and
recycling said $NO_2$-enriched regeneration gas to said oxyfuel combustion system.

15. A method according to any of #1 to #14, wherein said flue gas is contacted with said catalyst bed(s), and CO in said flue gas is converted to carbon dioxide to produce said carbon dioxide-enriched gas.

16. A method according to #15, wherein carbon dioxide is recovered from said carbon dioxide-enriched gas, or from a carbon dioxide-containing gas derived therefrom, by low temperature carbon dioxide purification to produce recovered carbon dioxide as a liquid and carbon dioxide-depleted gas comprising at least a portion of said non-condensable gas(es).

17. A method according to #15 or #16, wherein said flue gas comprises NO, and said catalyst bed(s) oxidizes NO to $NO_2$ to produce carbon dioxide-enriched gas that is enriched with $NO_2$, said method comprising removing $NO_2$ from said carbon dioxide-enriched gas to produce said carbon dioxide-containing gas that is at least lean in $NO_2$.

18. A method according to #1 to #14, said method comprising recovering carbon dioxide from said flue gas by low temperature carbon dioxide purification to produce recovered carbon dioxide as a liquid and said CO-containing gas which is depleted in carbon dioxide, wherein said CO-containing gas is contacted with said catalyst bed(s), and CO in said CO-containing gas is converted to carbon dioxide to produce said carbon dioxide-enriched gas.

19. A method according to #18, said method comprising:
separating said carbon dioxide-enriched gas in a membrane separation system into a carbon dioxide-rich permeate fraction and a non-condensable gas(es)-enriched retentate fraction; and
recycling said carbon dioxide-rich permeate fraction to said oxyfuel combustion system, optionally after being used to regenerate at least one adsorbent bed.

20. A method according to #18 or #19, wherein said CO-containing gas comprises NO, and said catalyst bed(s) oxidizes NO to $NO_2$ to produce carbon dioxide-enriched gas that is enriched with $NO_2$, said method comprising removing $NO_2$ from said carbon dioxide-enriched gas, or from a non-condensable gas(es)-enriched gas derived therefrom that comprises $NO_2$, to produce residual gas that is at least lean in $NO_2$.

21. A method according to #1 to #14, said method comprising recovering carbon dioxide from said flue gas by low temperature carbon dioxide purification to produce recovered carbon dioxide as a liquid and a carbon dioxide-lean gas comprising at least a portion of said non-condensable gas(es), wherein said carbon dioxide-lean gas, or a carbon dioxide-depleted gas derived therefrom, is contacted as said CO-containing gas with said catalyst bed(s), and CO in said CO-containing gas is converted to carbon dioxide to produce said carbon dioxide-enriched gas.

22. A method according to #21, wherein said carbon dioxide-lean gas is separated in a membrane separation system to produce a carbon dioxide-rich gas and said carbon dioxide-depleted gas.

23. A method according to #21 or #22, wherein said carbon dioxide-enriched gas is expanded to produce power and vented without further recovery of carbon dioxide.

24. A method according to #21 or #22, said method comprising:
expanding said carbon dioxide-enriched gas to produce power and expanded carbon dioxide-enriched gas;
recovering carbon dioxide and, optionally, oxygen from said expanded carbon dioxide-enriched gas to produce recovered carbon dioxide and further carbon dioxide-depleted gas comprising at least a portion of said non-condensable gas(es); and
recycling said recovered carbon dioxide to said oxyfuel combustion system.

25. A method according to #24, said method comprising:
expanding said further carbon dioxide-depleted gas to produce power and expanded carbon dioxide-depleted gas; and either
venting said expanded carbon dioxide depleted gas; or
using said expanded carbon dioxide-depleted gas to regenerate at least one adsorption bed,
wherein said further carbon dioxide-depleted gas is optionally heated prior to expansion.

26. A method according to #1 to #10, wherein said flue gas, or said CO-containing gas derived therefrom, comprises NO and wherein said catalyst bed(s) reduces NO to nitrogen ($N_2$) in the presence of a reducing gas, said carbon dioxide-enriched gas thereby also being enriched with $N_2$.

27. A method according to any of #1 to #26, wherein said flue gas comprises $SO_x$, said method comprising removing $SO_x$ from said flue gas prior to contacting said flue gas, or said CO-containing gas derived therefrom, with said catalyst bed(s).

28. Apparatus for removing CO from flue gas comprising carbon dioxide, CO and at least one non-condensable gas, said apparatus comprising:
an oxyfuel combustion system for generating said flue gas by oxyfuel combustion of a fuel;
a pressurizable catalytic reactor system comprising at least one catalyst bed comprising a CO-oxidation catalyst, for converting CO from said flue gas in the presence of $O_2$ at a first elevated temperature and at a first elevated pressure to carbon dioxide, to produce carbon dioxide-enriched gas comprising at least a portion of said non-condensable gas(es).

29. Apparatus according to #28, said apparatus comprising a heat exchange system for recovering heat from said carbon dioxide gas by indirect heat exchange with said flue gas, or said CO-containing gas derived therefrom, as feed to the pressurizable catalytic reactor system.

30. Apparatus according to #28 or #29, said apparatus comprising a carbon dioxide recovery system for recovering carbon dioxide from said carbon dioxide-enriched gas, or from a carbon dioxide-containing gas derived therefrom, to produce recovered carbon dioxide and carbon dioxide-depleted gas comprising at least a portion of said non-condensable gas(es).

31. Apparatus according to #30, wherein said carbon dioxide recovery system is selected from the group consisting of low temperature carbon dioxide purification system; a membrane separation system; and any combination thereof.

32. Apparatus according to #30 or #31, wherein said carbon dioxide recovery system comprises a membrane separation system, said apparatus comprising a conduit arrangement for recycling a carbon dioxide-rich permeate fraction from said membrane separation system to said oxyfuel combustion system, optionally via at least one adsorbent bed.

33. Apparatus according to #28 to #32, wherein said catalyst bed(s) also converts NO to $NO_2$.

34. Apparatus according to #28 to #32, wherein said catalyst bed(s) also converts NO to $N_2$ in the presence of a reducing gas.

35. Apparatus according to #28 to #33, said apparatus further comprising a $NO_2$ removal system for removing $NO_2$ from said carbon dioxide-enriched gas, or from a $NO_2$-containing gas derived therefrom.

36. Apparatus according to #35, wherein said $NO_2$ removal system is selected from the group consisting of an adsorption system; a sour gas reactor system to convert $NO_2$ to nitric acid condensate; a membrane separation system; and any combination of two or more of said systems.

37. Apparatus according to any of #28 to #36, said apparatus further comprising a $SO_x$ removal system for removing $SO_x$ from said flue gas upstream of said pressurizable catalytic reactor system.

38. Apparatus for removing CO and NO from flue gas comprising carbon dioxide, CO, NO and at least one non-condensable gas, said apparatus comprising:
an oxyfuel combustion system for generating said flue gas by oxyfuel combustion of a carbonaceous fuel;
a removal system for removing water soluble components and solid particulates from said flue gas;
a compression system for compressing said flue gas;
a $SO_2$ removal system for removing $SO_2$ from said flue gas;
a pressurizable catalytic reactor system comprising at least one catalyst bed comprising a CO-oxidation catalyst, for converting CO and NO in said flue gas in the presence of $O_2$ at a first elevated temperature and at a first elevated pressure to carbon dioxide and $NO_2$ respectively, to produce $NO_2$/carbon dioxide-enriched gas comprising at least a portion of said non-condensable gas(es);
a $NO_2$ removal system for removing $NO_2$ from said $NO_2$/carbon dioxide-enriched gas to produce carbon dioxide-enriched gas that is at least lean in $NO_2$;
a water adsorption system comprising at least one adsorbent bed for drying said carbon dioxide-enriched gas; and
a low temperature carbon dioxide purification system for purifying dried carbon dioxide-enriched gas to produce liquid carbon dioxide and carbon dioxide-depleted gas comprising at least a portion of said non-condensable gas(es).

39. Apparatus for removing CO and NO from flue gas comprising carbon dioxide, CO, NO and at least one non-condensable gas, said apparatus comprising:
an oxyfuel combustion system for generating said flue gas by oxyfuel combustion of a carbonaceous fuel;
a removal system for removing water soluble components and solid particulates from said flue gas;
a compression system for compressing said flue gas;
a $SO_2$ removal system for removing $SO_2$ from said flue gas;
a water adsorption system comprising at least one adsorbent bed for drying said flue gas;

a low temperature carbon dioxide purification system for purifying dried flue gas to produce liquid carbon dioxide and a NO/CO-containing gas that is depleted in carbon dioxide;

a pressurizable catalytic reactor system comprising at least one catalyst bed comprising a CO-oxidation catalyst, for converting CO and NO in said NO/CO-containing gas in the presence of $O_2$ at a first elevated temperature and at a first elevated pressure to carbon dioxide and $NO_2$ respectively, to produce $NO_2$/carbon dioxide-enriched gas comprising at least a portion of said non-condensable gases;

a heat exchange system for recovering heat from said $NO_2$/carbon dioxide-enriched gas by indirect heat exchange with said CO-containing gas as feed to said pressurizable catalytic reactor system;

a membrane separation system for separating said $NO_2$/carbon dioxide-enriched gas into a carbon dioxide-rich permeate fraction that is rich in $O_2$, and a non-condensable gas(es)-enriched retentate fraction containing $NO_2$;

a conduit arrangement for recycling said carbon dioxide-rich permeate fraction to said oxyfuel combustion system, optionally via at least one adsorbent bed in said water adsorption system; and a $NO_2$ removal system for removing $NO_2$ from said non-condensable gas(es)-enriched retentate fraction.

40. Apparatus for removing CO and NO from flue gas comprising carbon dioxide, CO, NO and at least one non-condensable gas, said apparatus comprising:

an oxyfuel combustion system for generating said flue gas by oxyfuel combustion of a carbonaceous fuel;

a removal system for removing water soluble components and solid particulates from said flue gas;

a compression system for compressing said flue gas;

a $SO_2$ removal system for removing $SO_2$ from said flue gas;

a water adsorption system comprising at least one adsorbent bed for drying said flue gas;

a low temperature carbon dioxide purification system for purifying dried flue gas to produce liquid carbon dioxide and a NO/CO-containing gas that is depleted in carbon dioxide;

a membrane separation system for separating said NO/CO-containing gas into a carbon dioxide-rich permeate fraction that is rich in $O_2$, and a non-condensable gas(es)-enriched retentate fraction containing NO and CO;

a conduit arrangement for recycling said carbon dioxide-rich permeate fraction to said oxyfuel combustion system, optionally via at least one adsorbent bed in said water adsorption system; and a pressurizable catalytic reactor system comprising at least one catalyst bed comprising a CO-oxidation catalyst, for converting CO and NO in said non-condensable gas(es)-enriched retentate fraction in the presence of $O_2$ at a first elevated temperature and at a first elevated pressure to carbon dioxide and $NO_2$ respectively, to produce $NO_2$/carbon dioxide-enriched gas comprising at least a portion of said non-condensable gases, wherein said apparatus optionally comprises a $NO_2$ removal system for removing $NO_2$ from said $NO_2$/carbon dioxide-enriched gas.

The following is a discussion of the embodiments of the present invention exemplified in the Figures. It should be noted that the percentages indicated for the various components in the gas streams are approximate molar percentages (mol. %) calculated on a dry basis and rounded to the nearest integer, and the pressures indicated are absolute pressures.

Referring to FIG. 1, a stream 2 of pulverized coal is fed, together with a stream 4 of $O_2$ (95% $O_2$; 2% $N_2$; and 3% Ar) to an oxyfuel combustion system 6 where the coal is combusted to produce a raw flue gas which is processed to remove water soluble components such as $SO_3$, HCl and HF, and solid particulates. A stream 8 of flue gas (72% $CO_2$; 19% $N_2$; 3% Ar; 6% $O_2$; and CO, $SO_2$ and $NO_x$ as contaminants) is fed to a first stage 10 of a compression system where the gas is compressed to about 15 bar (1.5 MPa).

A stream 12 of compressed flue gas is then fed to a first sour gas reactor system 14 within which $SO_2$ in the flue gas is converted to sulfuric acid condensate. In the first sour gas reactor system 14, the compressed flue gas is maintained at the first elevated pressure in the presence of $O_2$ from the flue gas and water in a pressurizable reactor vessel (not shown) for a period of time sufficient to convert $SO_2$ from the flue gas to sulfuric acid condensate. During this time, some of the $NO_x$ in the flue gas may also be converted to nitric acid condensate. The aqueous (mixed) acid condensate is separated from the flue gas and a stream 16 of the aqueous (mixed) acid condensate is removed and further processed as required.

A stream 18 of $SO_2$-depleted ($NO_x$-lean) flue gas is removed from the first sour gas reactor system 14 and is fed to a second stage 20 of the carbon dioxide compression system where the gas is compressed to a first elevated pressure of about 30 bar (3 MPa).

A stream 22 of compressed flue gas (74% $CO_2$; 19% $N_2$; 3% Ar; 5% $O_2$; and CO and $NO_x$ as contaminants) is fed at the first elevated pressure and at a first elevated temperature of about 160° C. to a pressurizable catalytic reactor system 24 where the gas is contacted with at least one catalytic bed (not shown) comprising a CO-conversion catalyst. In the reactor system 24, CO and NO in the flue gas are oxidized catalytically using $O_2$ from the flue gas to produce $CO_2$ and $NO_2$ respectively.

A stream 26 of $NO_2$/carbon dioxide-enriched flue gas (75% $CO_2$; 19% $N_2$; 3% Ar; 4% $O_2$; and $NO_2$) is removed from reactor system 24 and fed to a second sour gas reactor system 28. In the second sour gas reactor system 28, the $NO_2$/carbon dioxide-enriched flue gas is maintained at the first elevated pressure in the presence of $O_2$ from the flue gas and water for a period of time sufficient to convert $NO_x$ in the flue gas to nitric acid condensate to produce $NO_2$-lean flue gas. Aqueous nitric acid condensate is separated from the $NO_2$-lean flue gas and a stream 30 of the aqueous nitric acid condensate is removed and further processed as required.

Any residual $SO_2$ in the $NO_2$/carbon dioxide-enriched flue gas will be converted to sulfuric acid condensate in the second sour gas reactor system 28 and, thus, the aqueous nitric acid condensate may contain some sulfuric acid condensate. However, it is preferred that at least substantially all of the $SO_2$ is removed from the flue gas in the first sour gas reactor system 14 in order to prevent $SO_2$ from poisoning the catalyst bed.

A significant part of the carbon dioxide formed by oxidation of CO is captured by a low temperature carbon dioxide purification process. In this connection, as stream 32 of carbon dioxide-containing gas that is at least lean in $NO_2$ (75% $CO_2$; 19% $N_2$; 3% Ar; and 4% $O_2$) is removed from the second sour gas reactor system 28 and fed to the low temperature carbon dioxide purification system 34. The carbon dioxide-containing gas is cooled and partially condensed to produce substantially pure carbon dioxide liquid and a tail gas (25% $CO_2$; 53% $N_2$; 7% Ar; and 15% $O_2$). A stream 36 of pure carbon dioxide liquid is separated and removed from the low temperature carbon dioxide purification system 34, and may be further pressurized and fed to a geological storage site (not shown) or used in EOR (not shown). A stream 38 of the separated tail gas may be warmed (not shown), expanded (not shown) to generate power and then vented to the atmosphere.

In the standard process for $NO_x$ removal by the sour compression reactions, NO reacts with $O_2$ to form $NO_2$, and $NO_2$ is removed as nitric acid condensate. The reaction of NO with $O_2$ to form $NO_2$ is the rate limiting step and, therefore, this reaction "sizes" the reactor vessel. Converting NO to $NO_2$ using a catalyst prior to the sour gas reactor system helps in the $NO_x$ removal step and, potentially, has the advantage of reducing the residence time required and the size of any reactor vessel required to provide additional contact time in the sour gas reactor system.

Figure 2:
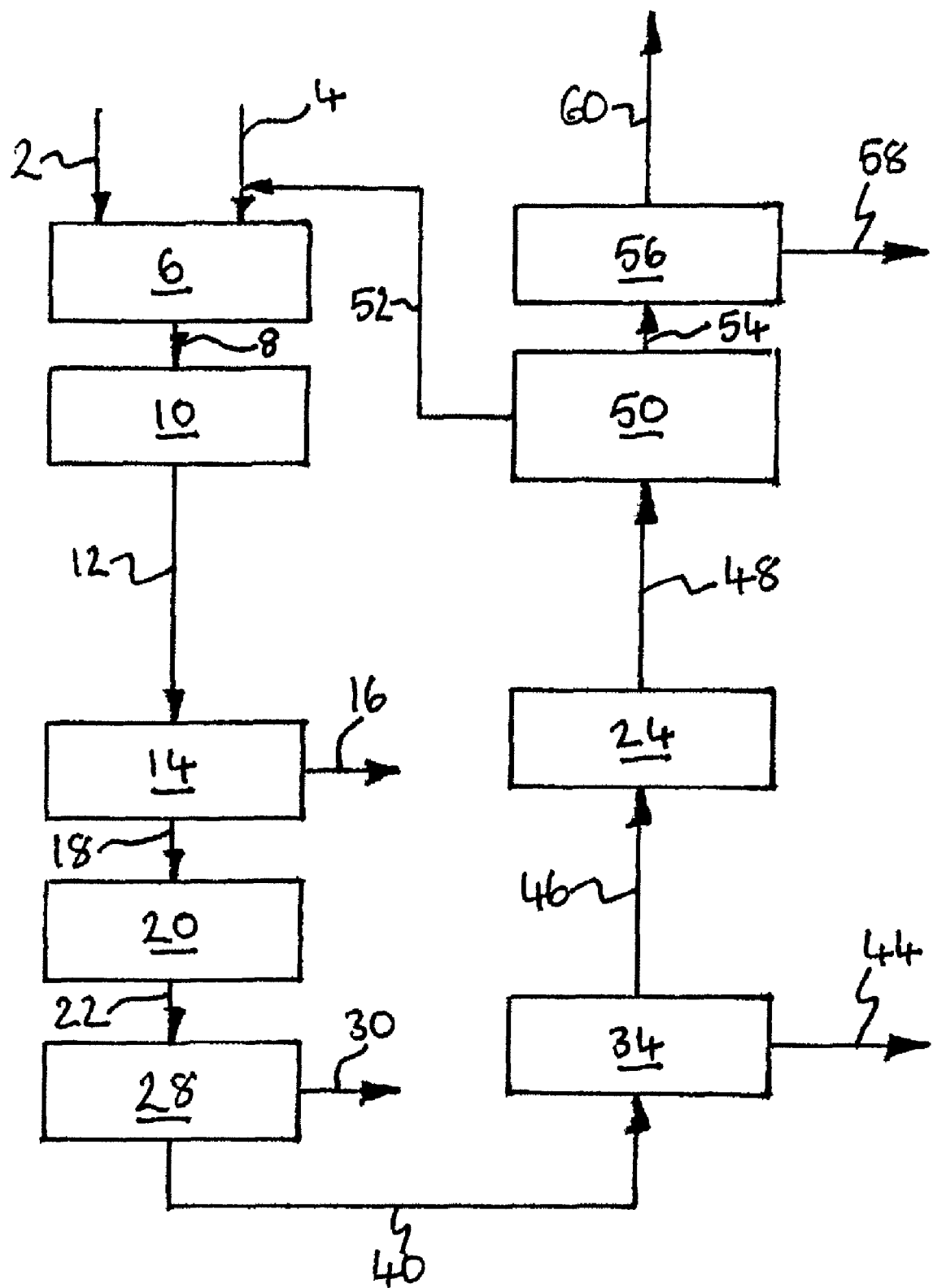
FIG. 2 is a simplified flow sheet depicting a second embodiment of the present invention.

A second embodiment of the present invention is depicted in FIG. 2 in which a membrane separation system is used after a low temperature carbon dioxide purification process to capture carbon dioxide and $O_2$ from the "residual" or waste gas from the purification and this carbon dioxide/$O_2$-rich gas is recycled to the oxyfuel combustion unit generating the flue gas. The features that are common between embodiments depicted in FIGS. 1 and 2 have been given the same references numerals. The following is a discussion of the different features in the embodiment depicted in FIG. 2.

The first sour compression reactor system 14 removes primarily $SO_2$ from the stream 12 of compressed flue gas fed thereto to produce the stream 16 of aqueous sulfuric acid condensate. It is understood that little or no nitric acid condensate is present stream 16. The absence of any significant quantity of nitric acid may be due to insufficient hold-up time in the reactor vessel (not shown) of the first sour gas reactor system 14.

The stream 22 of compressed flue gas at the first elevated pressure is fed to the second sour gas removal system 28 in which the compressed flue gas is maintained at the first elevated pressure in the presence of $O_2$ from the flue gas and water for a period of time sufficient to convert $NO_x$ in the flue gas to nitric acid condensate to produce flue gas having reduced $NO_x$. Aqueous nitric acid condensate is separated from the flue gas having reduced $NO_x$ and a stream 30 of the aqueous nitric acid condensate is removed and may be further processed as required.

A stream 40 of the $NO_x$-lean flue gas (73% $CO_2$; 19% $N_2$; 3% Ar; 5% $O_2$; and CO and reduced $NO_x$ as contaminants) is removed from the second sour gas reactor system 28 and fed to the low temperature carbon dioxide purification system 34 where it is cooled and partially condensed to produce substantially pure carbon dioxide liquid (96% $CO_2$; 2% $N_2$; 1% Ar; and 1% $O_2$) and a CO-containing tail gas (29% $CO_2$; 51% $N_2$; 7% Ar; 13% $O_2$; and CO and $NO_x$ as contaminants). A stream 44 of substantially pure carbon dioxide liquid is separated and removed from the low carbon dioxide purification system 34.

A stream 46 of the NO/CO-containing tail gas is removed from the low carbon dioxide purification system 34, heated to an elevated temperature of about 160° C. and fed at the elevated temperature and at the first elevated pressure to a pressurizable catalytic reactor system 24 where the gas is contacted with at least one catalyst bed comprising a CO-oxidation catalyst. In the reactor system 24, CO and NO in the tail gas are oxidized catalytically using $O_2$ from the flue gas to produce $CO_2$ and $NO_2$ respectively.

A stream 48 of $NO_2$/carbon dioxide-enriched tail gas (29% $CO_2$; 51% $N_2$; 7% Ar; 13% $O_2$; and $NO_2$) is removed from reactor system 24 and fed to a membrane separation system 50 in which carbon dioxide/$O_2$-rich permeate fraction (62% $CO_2$; 16% $N_2$; 5% Ar; and 16% $O_2$) is separated from the tail gas and is recycled as stream 52 to the oxyfuel combustion system 6.

A stream 54 of non-condensable gases-enriched retentate gas is fed to a third sour gas reactor system 56 in which the gas is maintained at the first elevated pressure in the presence of $O_2$ from the flue gas and water for a period of time sufficient to convert $NO_x$ to nitric acid condensate and produce residual gas that is at least lean in $NO_x$. Aqueous nitric acid condensate is separated from the residual gas and a stream 58 of aqueous nitric acid condensate is removed and may be further processed as required. A stream 60 of the residual gas (7% $CO_2$; 73% $N_2$; 9% Ar; and 10% $O_2$) may be warmed (not shown), expanded (not shown) to generate power and then vented to the atmosphere.

Since the catalytic step in the process of FIG. 2 takes place only on the CO-containing tail gas from the low temperature carbon dioxide purification process, a much smaller catalyst unit can advantageously be used because the volumetric flow rate is much smaller than that for the process depicted in FIG. 1. In addition, the amount of $NO_x$ present will be significantly reduced. The concentration of $O_2$ is higher which helps the oxidation reaction, and the concentration of carbon dioxide is lower which may increase the lifetime of a metal oxide catalyst due to a reduction in the rate of formation of carbonates. Another advantage of this embodiment is that the feed stream to the catalyst bed is dry.

In this other embodiment, a significant portion of the $NO_x$ is removed in the second sour gas reactor system 28. Therefore, capturing $NO_2$ after the oxidation step to reduce the concentration of this component in the gas to be vented may not be necessary. However, if it is required, then a third sour gas reactor system designed in a similar manner as that for the second sour gas reactor system may be added to at least partially remove the $NO_2$ as nitric acid condensate.

It should be noted that $NO_x$ may be removed from the $NO_2$/carbon dioxide-enriched gas in FIG. 1, or from the non-condensable gases-enriched retentate gas in FIG. 2, in ways other than by washing the $NO_x$ out of the gas as nitric acid condensate. For example, the $NO_x$ may be separated by distillation using a column; membrane separation; or by adsorption using either a PSA or TSA adsorber system.

Figure 3:
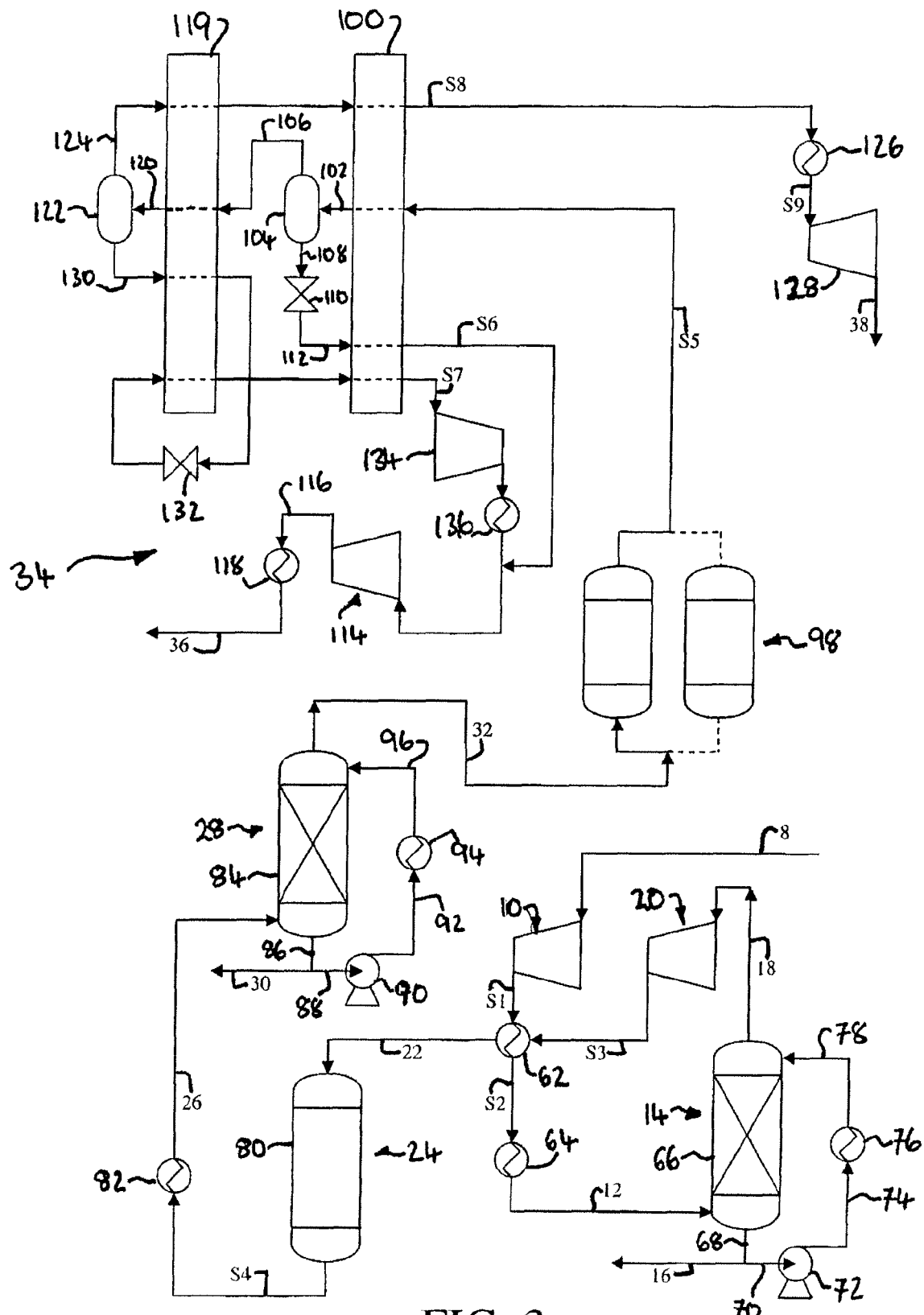
FIG. 3 is a flow sheet depicting one arrangement of the section of the embodiment depicted in FIG. 1 that is downstream of the oxyfuel combustion system 6.

FIG. 3 depicts in more detail the section of one possible arrangement of the embodiment of FIG. 1 that is downstream of the oxyfuel combustion system 6. The features which are common to FIGS. 1 and 3 have the same reference numbers.

Regarding FIG. 3, the stream 8 of flue gas is compressed to about 15 bar (1.5 MPa) in compression system 10 to provide a stream S1 of compressed flue gas which is cooled by indirect heat exchange against compressed $SO_2$-depleted ($NO_x$-lean) flue gas at about 30 bar (3 MPa) in heat exchange system 62 to provide a stream S2 of cooled compressed flue gas. Stream S2 is further cooled by indirect heat exchange against a coolant in heat exchange system 64 to provide stream 12 which is fed to the first sour gas reactor system 14.

Stream 12 is fed to a first countercurrent gas/liquid contact column 66 where the gas is maintained at about 15 bar (1.5 MPa) in the presence of $O_2$ and water from the flue gas for sufficient time to convert the $SO_2$ to sulfuric acid condensate. A stream 68 of acid condensate (which may contain some nitric acid condensate), is removed from column 66 and divided into two streams; stream 16 which is removed and further processed as necessary, and stream 70 which is pumped in pump system 72 to produce pumped stream 74 which is cooled by indirect heat exchange against a coolant in heat exchange system 76 to produce cooled stream 78 which is fed to the top of the column 66 as reflux.

Stream 18 of $SO_2$-depleted ($NO_x$-lean) flue gas is removed from the top of column 66, compressed in compression system 20 to about 30 bar (3 MPa) to produce a stream S3 of compressed flue gas which is then heated by indirect heat exchange against stream S1 of compressed flue gas at about 15 bar in heat exchange system 62 to produce stream 22 of compressed flue gas at the first elevated pressure and at a first elevated temperature of about 160° C. which is then fed to the pressurizable catalytic reactor system 24.

Stream 22 is contacted with at least one catalytic bed 80 comprising a CO-oxidation catalyst such as a hopcalite catalyst, in the presence of $O_2$ from the flue gas such that CO and NO are converted to carbon dioxide and $NO_2$ respectively. A stream S4 of $NO_2$/carbon dioxide-enriched gas is removed from the catalytic reactor system 24, cooled by indirect heat exchange against a coolant in heat exchange system 82 to produce stream 26 of $NO_2$/carbon dioxide-enriched flue gas which is fed to the second sour gas reactor system 28.

Stream 26 is fed to a second countercurrent gas/liquid contact column 84 where the gas is maintained at about 30 bar (3 MPa) in the presence of $O_2$ and water from the flue gas for sufficient time to convert the $NO_2$ to nitric acid condensate. A stream 86 of acid condensate is removed from column 84 and divided into two streams; stream 30 which is removed and further processed as necessary, and stream 88 which is pumped in pump system 90 to produce pumped stream 92 which is cooled by indirect heat exchange against a coolant in heat exchange system 94 to produce cooled stream 96 which is fed to the top of the column 84 as reflux.

Stream 32 of carbon dioxide-containing gas that is at least lean in $NO_2$ is removed from the top of column 84 and fed to the low temperature carbon dioxide purification system 34 where the gas is dried in an adsorbent dryer system 98 to produce a stream S5 of dried carbon dioxide-containing gas. Stream S5 is cooled and partially condensed by indirect heat exchange in heat exchange system 100 to produce a two phase stream 102. The phases in stream 102 are separated in a first vapor/liquid separator system 104 to produce a stream 106 of a first tail gas and a stream 108 of substantially pure liquid carbon dioxide. Stream 108 is expanded across expansion valve 110 to a pressure of about 17 bar (1.7 MPa) and used a stream 112 to provide refrigeration duty in heat exchange system 100, producing stream S6 of warmed carbon dioxide. Stream S6 is compressed to about 120 bar (12 MPa) in compression system 114 to produce stream 116 of compressed carbon dioxide which is cooled by indirect heat exchange against a coolant in heat exchange system 118 to produce stream 36 of substantially pure carbon dioxide.

Stream 106 is cooled and partially condensed by indirect heat exchange in heat exchange system 119 to produce a two phase stream 120. The phases in stream 120 are separated in a second vapor/liquid separator system 122 to produce a stream 124 of a second tail gas and a stream 130 of substantially pure liquid carbon dioxide. Stream 130 is warmed by indirect heat exchange in heat exchange system 119, expanded across expansion valve 132 to a pressure of about 7 bar (0.7 MPa) and used to provide refrigeration duty in heat exchange systems 119 and 100, producing stream S7 of warmed carbon dioxide which is compressed in compression system 134 to about 17 bar (1.7 MPa), cooled by indirect heat exchange against a coolant in heat exchange system 136, and combined with stream S6.

Stream 124 is warmed by indirect heat exchange in heat exchange systems 119 and 100 to provide stream S8 of warmed tail gas, which is heated by indirect heat exchange in heat exchange system 126 to produce stream S9, expanded in expansion system 128 to produce stream 38 which is then vented to the atmosphere.

Figure 4:
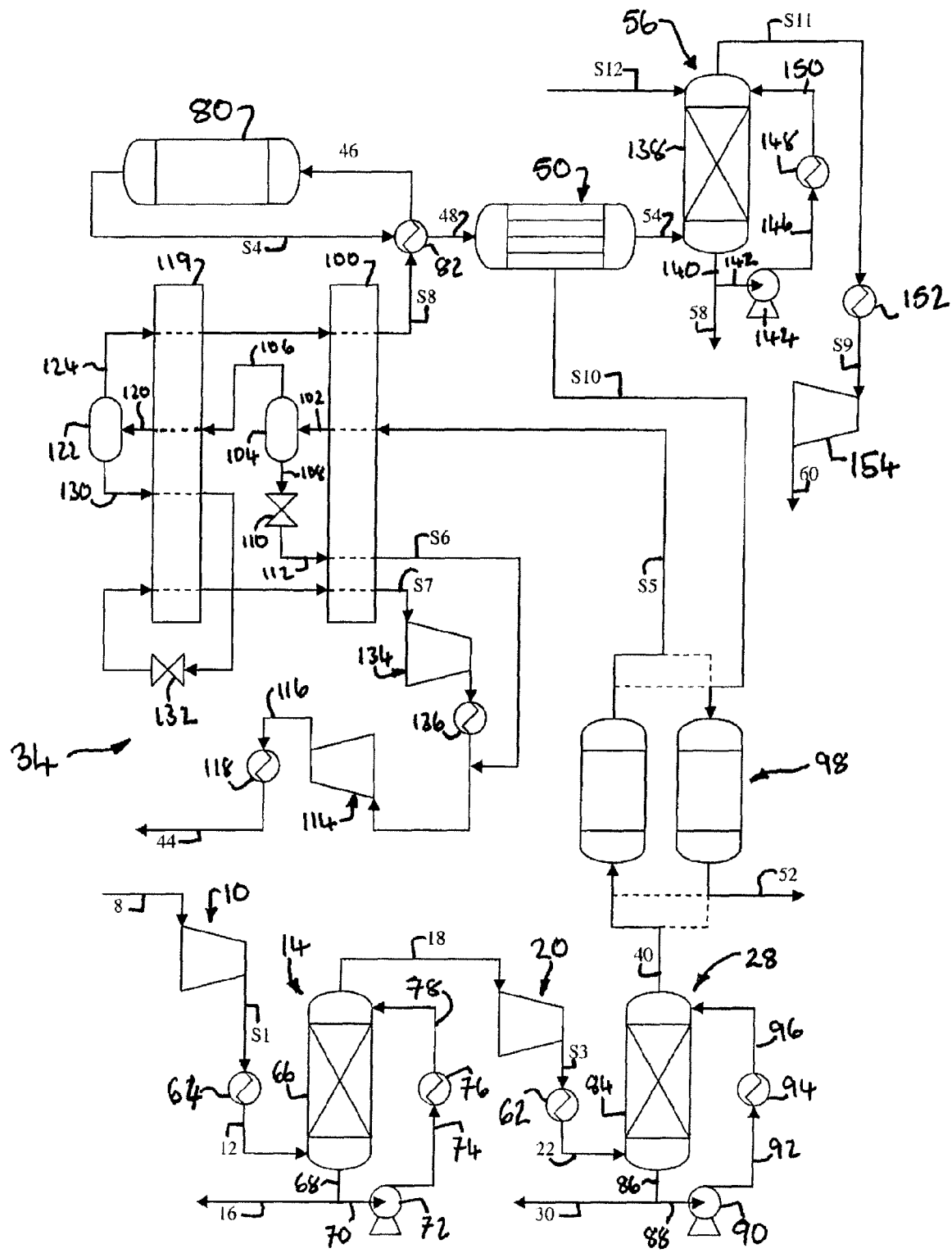
FIG. 4 is a flow sheet depicting a third embodiment of the present invention.

FIG. 4 depicts a third embodiment of the present invention. This embodiment is very similar to the embodiment depicted in FIG. 2 with the exception that the $O_2$/carbon dioxide-rich permeate gas produced in the membrane separation system 50 is used to regenerate the adsorbent bed(s) of the dryer 98 in the low temperature carbon dioxide purification system 34 prior to being recycled to the oxyfuel combustion system 6. The features which are common to FIGS. 1 to 4 have the same reference numbers.

Rather than being fed to a pressurizable catalytic reactor system, stream 22 is fed to the second sour gas reactor system 28 operating at about 30 bar (3 MPa) where some $NO_x$ and any residual $SO_2$ are converted by the sour compression reactions to nitric acid condensate and sulfuric acid condensate.

Stream 40 of $NO_x$-lean flue gas is fed to the low temperature carbon dioxide purification system 34 where it is dried in at least one adsorbent bed of the adsorbent dryer system 98 and processed to form stream 44 of pure carbon dioxide and stream S8 of NO/CO-containing tail gas. Stream S8 is warmed to the first elevated temperature by indirect heat exchange against a stream S4 of $NO_2$/carbon dioxide-enriched gas in heat exchange system 82 to produce stream 46 as feed to the pressurizable catalytic reactor system 80 producing stream S4.

Stream S4 is cooled in heat exchange system 82 to produce stream 48 which is fed to membrane separation system 50 to produce stream S10 of $O_2$/carbon dioxide-rich permeate gas and stream 54 of non-condensable gases-enriched retentate gas. Stream S10 is used to regenerate the adsorbent bed(s) of the adsorption dryer 98. Having regenerated the beds, the $O_2$/carbon dioxide-rich gas is then recycled as stream 52 to the oxyfuel combustion system 6 (not shown).

Stream 54 of non-condensable gases-enriched gas is fed to the third sour gas reactor system 56. In this regard, stream 54 is fed to a third countercurrent gas/liquid contact column 138 where the gas is maintained at about 30 bar (3 MPa) in the presence of $O_2$ from the flue gas and water for sufficient time to convert the $NO_2$ to nitric acid condensate. Since the gas has been dried in adsorption dryer 98, there is no water in the gas. Therefore, water is added to the column 138 as stream S12. A stream 140 of acid condensate is removed from column 138 and divided into two streams; stream 58 which is removed and further processed as necessary, and stream 142 which is pumped in pump system 144 to produce pumped stream 146 which is cooled by indirect heat exchange against a coolant in heat exchange system 148 to produce cooled stream 150 which is fed to the top of the column 138 as reflux.

Stream S11 of the residual gas is removed from column 138, warmed by indirect heat exchange in heat exchange system 152 to produce stream S9 which is expanded in expansion system 154 to generate power and produce stream 60 of expanded gas which is then vented to the atmosphere.

Figure 5:
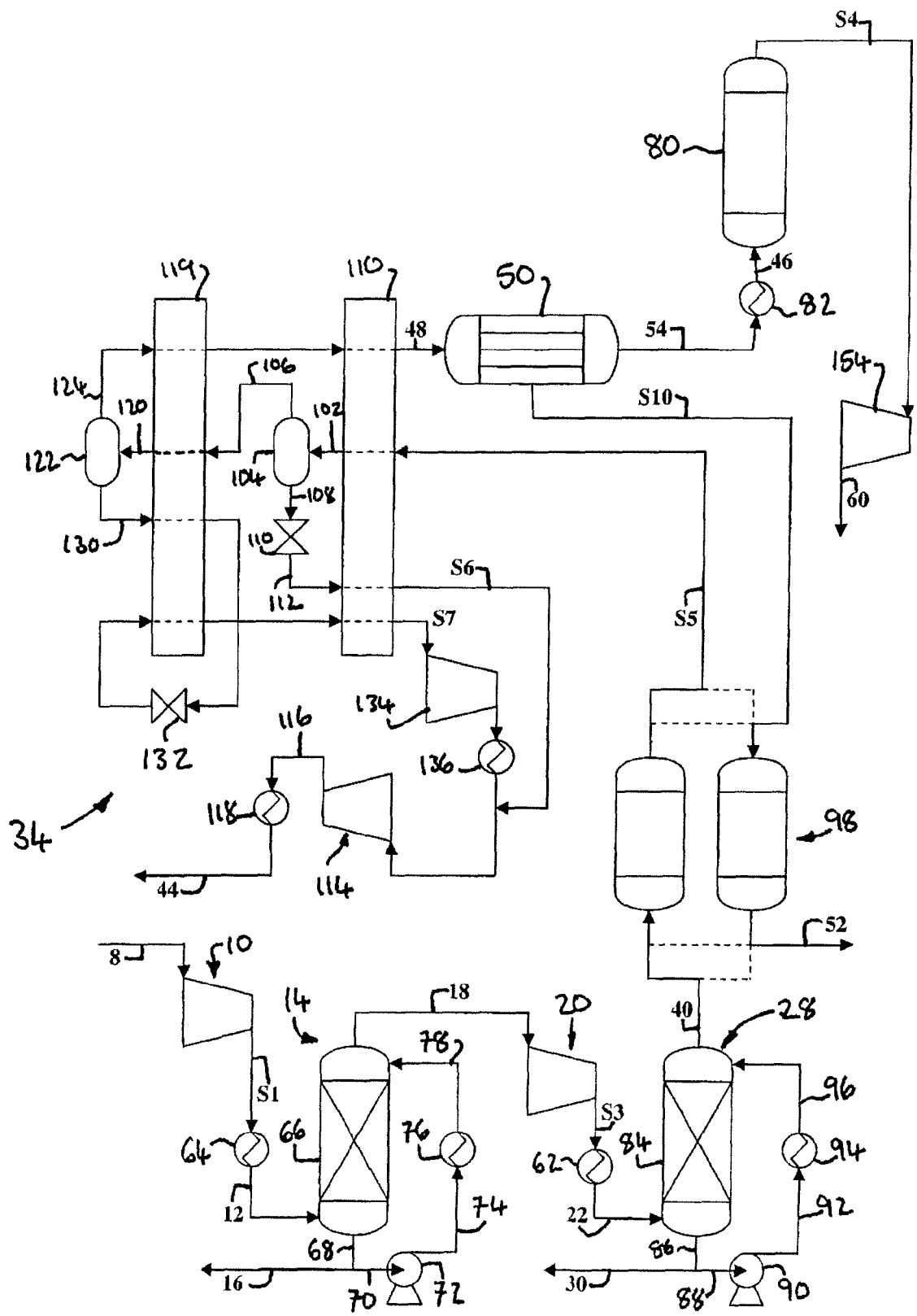
FIG. 5 is a flow sheet depicting a fourth embodiment of the present invention.

FIG. 5 depicts a fourth embodiment of the present invention. This embodiment is very similar to the embodiment depicted in FIG. 4 with the exceptions that the membrane separation system 50 is placed between the low temperature carbon dioxide purification system 34 and the pressurizable catalytic reactor system 80, and that there is no $NO_2$ recovery downstream of reactor system 80 prior to expanding and venting the $NO_2$/carbon dioxide-enriched gas to the atmosphere. The features which are common to FIGS. 1 to 5 have the same reference numbers.

EXAMPLE

Computer simulations using the APSEN™ Plus software (version 2006.5; © Aspen Technology, Inc.) have been carried out in respect of the embodiments depicted in FIGS. 3 to 5. For each embodiment, a first simulation has been carried out on the basis that there is sufficient catalyst in the catalyst bed(s) to achieve 90% CO conversion, and a second simulation has been carried out on the basis that there is no catalyst in the bed(s). The results of the simulations are presented in the following heat and mass balance tables.

TABLE 2

Embodiment of FIG. 3 (with catalyst)

| Stream | — | 8 | 12 | 16 | 18 | 22 | 26 | 30 | 32 | 36 | 38 |
|---|---|---|---|---|---|---|---|---|---|---|---|
| Pressure | Bar | 1.01 | 15.00 | 15.00 | 15.00 | 30.00 | 30.00 | 30.00 | 30.00 | 120.00 | 2.00 |
|  | (MPa) | (0.1) | (1.5) | (1.5) | (1.5) | (3) | (3) | (3) | (3) | (12) | (0.2) |
| Temperature | °C. | 30.09 | 30.00 | 65.00 | 65.00 | 160.00 | 30.00 | 34.15 | 40.00 | 30.00 | 26.67 |
| Flow Rate | kg/s | 150.6 | 150.6 | 6.8 | 143.8 | 143.8 | 143.8 | 1.4 | 142.5 | 107.7 | 34.6 |
| Ar | mol % | 2.711 | 2.711 | 0.005 | 2.867 | 2.867 | 2.871 | 0.002 | 2.918 | 0.455 | 8.906 |
| $CO_2$ | mol % | 70.518 | 70.518 | 3.154 | 74.484 | 74.484 | 74.759 | 0.761 | 75.971 | 96.662 | 26.714 |
| $N_2$ | mol % | 15.751 | 15.751 | 0.013 | 16.657 | 16.657 | 16.676 | 0.004 | 16.949 | 2.268 | 52.644 |
| NO | ppm | 3991.4 | 3991.4 | 0.7 | 422.1 | 422.1 | 42.3 | 0.0 | 4.3 | 1.1 | 12.1 |
| $NO_2$ | ppm | 1.5 | 1.5 | 1275.4 | 722.3 | 722.3 | 1103.5 | 374.3 | 226.2 | 320.6 | 0.0 |
| $O_2$ | mol % | 4.673 | 4.673 | 0.011 | 3.885 | 3.885 | 3.775 | 0.002 | 3.812 | 0.580 | 11.670 |
| $HNO_3$ | mol % | 0.000 | 0.000 | 5.794 | 0.132 | 0.132 | 0.132 | 14.529 | 0.000 | 0.000 | 0.000 |
| $SO_2$ | ppm | 14967.6 | 14967.6 | 0.0 | 0.0 | 0.0 | 0.0 | 0.0 | 0.0 | 0.0 | 0.0 |
| $H_2O$ | mol % | 4.250 | 4.250 | 37.499 | 1.649 | 1.649 | 1.650 | 84.664 | 0.306 | 0.000 | 0.000 |
| $H_2SO_4$ | mol % | 0.000 | 0.000 | 53.397 | 0.000 | 0.000 | 0.000 | 0.002 | 0.000 | 0.000 | 0.000 |
| CO | ppm | 1995.7 | 1995.7 | 2.8 | 2110.5 | 2110.5 | 211.3 | 0.1 | 214.7 | 34.0 | 654.3 |

| Stream | — | S1 | S2 | S3 | S4 | S5 | S6 | S7 | S8 | S9 |
|---|---|---|---|---|---|---|---|---|---|---|
| Pressure | bar | 15.00 | 15.00 | 30.00 | 30.00 | 30.00 | 17.00 | 7.00 | 30.00 | 30.00 |
|  | (MPa) | (1.5) | (1.5) | (3) | (3) | (3) | (1.7) | (0.7) | (3) | (3) |
| Temperature | °C. | 313.72 | 289.20 | 133.04 | 173.71 | 40.00 | 31.12 | 31.12 | 31.12 | 280.00 |
| Flow Rate | kg/s | 150.6 | 150.6 | 143.8 | 143.8 | 142.3 | 85.1 | 22.6 | 34.6 | 34.6 |
| Ar | mol % | 2.711 | 2.711 | 2.867 | 2.871 | 2.927 | 0.422 | 0.580 | 8.906 | 8.906 |
| $CO_2$ | mol % | 70.518 | 70.518 | 74.484 | 74.759 | 76.204 | 96.862 | 95.913 | 26.714 | 26.714 |
| $N_2$ | mol % | 15.751 | 15.751 | 16.657 | 16.676 | 17.001 | 2.124 | 2.807 | 52.644 | 52.644 |
| NO | ppm | 3991.4 | 3991.4 | 422.1 | 42.3 | 4.3 | 0.9 | 1.7 | 12.1 | 12.1 |
| $NO_2$ | ppm | 1.5 | 1.5 | 722.3 | 1103.5 | 226.9 | 403.1 | 11.6 | 0.0 | 0.0 |
| $O_2$ | mol % | 4.673 | 4.673 | 3.885 | 3.775 | 3.823 | 0.549 | 0.695 | 11.670 | 11.670 |
| $HNO_3$ | mol % | 0.000 | 0.000 | 0.132 | 0.132 | 0.000 | 0.000 | 0.000 | 0.000 | 0.000 |
| $SO_2$ | ppm | 14967.6 | 14967.6 | 0.0 | 0.0 | 0.0 | 0.0 | 0.0 | 0.0 | 0.0 |
| $H_2O$ | mol % | 4.250 | 4.250 | 1.649 | 1.650 | 0.000 | 0.000 | 0.000 | 0.000 | 0.000 |
| $H_2SO_4$ | mol % | 0.000 | 0.000 | 0.000 | 0.000 | 0.000 | 0.000 | 0.000 | 0.000 | 0.000 |
| CO | ppm | 1995.7 | 1995.7 | 2110.5 | 211.3 | 215.4 | 31.7 | 42.7 | 654.3 | 654.3 |

TABLE 3

Embodiment of FIG. 3 (without catalyst)

| Stream | — | 8 | 12 | 16 | 18 | 22 | 26 | 30 | 32 | 36 | 38 |
|---|---|---|---|---|---|---|---|---|---|---|---|
| Pressure | Bar | 1.01 | 15.00 | 15.00 | 15.00 | 30.00 | 30.00 | 30.00 | 30.00 | 120.00 | 2.00 |
|  | (MPa) | (0.1) | (1.5) | (1.5) | (1.5) | (3) | (3) | (3) | (3) | (12) | (0.2) |
| Temperature | °C. | 30.09 | 30.00 | 65.00 | 65.00 | 160.00 | 30.00 | 34.30 | 40.00 | 30.00 | 26.73 |
| Flow Rate | kg/s | 150.6 | 150.6 | 6.8 | 143.8 | 143.8 | 143.8 | 1.4 | 142.5 | 107.2 | 35.0 |
| Ar | mol % | 2.711 | 2.711 | 0.005 | 2.867 | 2.867 | 2.867 | 0.002 | 2.915 | 0.450 | 8.799 |
| $CO_2$ | mol % | 70.518 | 70.518 | 3.154 | 74.484 | 74.484 | 74.484 | 0.760 | 75.700 | 96.653 | 26.710 |
| $N_2$ | mol % | 15.751 | 15.751 | 0.013 | 16.657 | 16.657 | 16.657 | 0.004 | 16.932 | 2.243 | 52.002 |
| NO | ppm | 3991.4 | 3991.4 | 0.7 | 422.1 | 422.1 | 422.1 | 0.0 | 42.9 | 10.8 | 119.7 |
| $NO_2$ | ppm | 1.5 | 1.5 | 1275.4 | 722.3 | 722.3 | 722.3 | 362.4 | 218.4 | 311.3 | 0.0 |
| $O_2$ | mol % | 4.673 | 4.673 | 0.011 | 3.885 | 3.885 | 3.885 | 0.002 | 3.907 | 0.588 | 11.830 |
| $HNO_3$ | mol % | 0.000 | 0.000 | 5.794 | 0.132 | 0.132 | 0.132 | 14.350 | 0.000 | 0.000 | 0.000 |
| $SO_2$ | ppm | 14967.6 | 14967.6 | 0.0 | 0.0 | 0.0 | 0.0 | 0.0 | 0.0 | 0.0 | 0.0 |
| $H_2O$ | mol % | 4.250 | 4.250 | 37.499 | 1.649 | 1.649 | 1.649 | 84.844 | 0.306 | 0.000 | 0.000 |
| $H_2SO_4$ | mol % | 0.000 | 0.000 | 53.397 | 0.000 | 0.000 | 0.000 | 0.002 | 0.000 | 0.000 | 0.000 |
| CO | ppm | 1995.7 | 1995.7 | 2.8 | 2110.5 | 2110.5 | 2110.5 | 0.7 | 2145.3 | 336.2 | 6464.8 |

| Stream | — | S1 | S2 | S3 | S4 | S5 | S6 | S7 | S8 | S9 |
|---|---|---|---|---|---|---|---|---|---|---|
| Pressure | Bar | 15.00 | 15.00 | 30.00 | 30.00 | 30.00 | 17.00 | 7.00 | 30.00 | 30.00 |
|  | (MPa) | (1.5) | (1.5) | (3) | (3) | (3) | (1.7) | (0.7) | (3) | (3) |
| Temperature | °C. | 313.72 | 289.20 | 133.04 | 160.00 | 40.00 | 31.15 | 31.15 | 31.15 | 280.00 |
| Flow Rate | kg/s | 150.6 | 150.6 | 143.8 | 143.8 | 142.3 | 84.3 | 22.9 | 35.0 | 35.0 |
| Ar | mol % | 2.711 | 2.711 | 2.867 | 2.867 | 2.924 | 0.417 | 0.573 | 8.799 | 8.799 |
| $CO_2$ | mol % | 70.518 | 70.518 | 74.484 | 74.484 | 75.932 | 96.857 | 95.905 | 26.710 | 26.710 |
| $N_2$ | mol % | 15.751 | 15.751 | 16.657 | 16.657 | 16.984 | 2.098 | 2.773 | 52.002 | 52.002 |
| NO | ppm | 3991.4 | 3991.4 | 422.1 | 422.1 | 43.0 | 9.2 | 16.3 | 119.7 | 119.7 |
| $NO_2$ | ppm | 1.5 | 1.5 | 722.3 | 722.3 | 219.1 | 393.2 | 11.3 | 0.0 | 0.0 |
| $O_2$ | mol % | 4.673 | 4.673 | 3.885 | 3.885 | 3.919 | 0.557 | 0.705 | 11.830 | 11.830 |
| $HNO_3$ | mol % | 0.000 | 0.000 | 0.132 | 0.132 | 0.000 | 0.000 | 0.000 | 0.000 | 0.000 |
| $SO_2$ | ppm | 14967.6 | 14967.6 | 0.0 | 0.0 | 0.0 | 0.0 | 0.0 | 0.0 | 0.0 |

TABLE 3-continued

Embodiment of FIG. 3 (without catalyst)

| | | | | | | | | | | |
|---|---|---|---|---|---|---|---|---|---|---|
| H$_2$O | mol % | 4.250 | 4.250 | 1.649 | 1.649 | 0.000 | 0.000 | 0.000 | 0.000 | 0.000 |
| H$_2$SO$_4$ | mol % | 0.000 | 0.000 | 0.000 | 0.000 | 0.000 | 0.000 | 0.000 | 0.000 | 0.000 |
| CO | ppm | 1995.7 | 1995.7 | 2110.5 | 2110.5 | 2151.8 | 312.9 | 421.8 | 6464.8 | 6464.8 |

TABLE 4

Embodiment of FIG. 4 (with catalyst)

| Stream | — | 8 | 12 | 16 | 18 | 22 | 30 | 40 | 44 | 46 |
|---|---|---|---|---|---|---|---|---|---|---|
| Pressure | Bar | 1.01 | 15.00 | 15.00 | 15.00 | 30.00 | 30.00 | 30.00 | 120.00 | 30.00 |
| | (MPa) | (0.1) | (1.5) | (1.5) | (1.5) | (3) | (3) | (3) | (12) | (3) |
| Temperature | °C. | 30.09 | 30.00 | 65.00 | 65.00 | 40.00 | 36.55 | 40.00 | 30.00 | 140.00 |
| Flow Rate | kg/s | 150.6 | 150.6 | 6.8 | 143.8 | 143.8 | 1.4 | 142.5 | 107.2 | 35.0 |
| Ar | mol % | 2.711 | 2.711 | 0.005 | 2.867 | 2.867 | 0.002 | 2.915 | 0.450 | 8.799 |
| CO$_2$ | mol % | 70.518 | 70.518 | 3.154 | 74.484 | 74.484 | 0.760 | 75.700 | 96.653 | 26.710 |
| N$_2$ | mol % | 15.751 | 15.751 | 0.013 | 16.657 | 16.657 | 0.004 | 16.932 | 2.243 | 52.002 |
| NO | ppm | 3991.4 | 3991.4 | 0.7 | 422.1 | 422.1 | 0.0 | 42.9 | 10.8 | 119.7 |
| NO$_2$ | ppm | 1.5 | 1.5 | 1275.4 | 722.3 | 722.3 | 362.4 | 218.4 | 311.3 | 0.0 |
| O$_2$ | mol % | 4.673 | 4.673 | 0.011 | 3.885 | 3.885 | 0.002 | 3.907 | 0.588 | 11.830 |
| HNO$_3$ | mol % | 0.000 | 0.000 | 5.794 | 0.132 | 0.132 | 14.350 | 0.000 | 0.000 | 0.000 |
| SO$_2$ | ppm | 14967.6 | 14967.6 | 0.0 | 0.0 | 0.0 | 0.0 | 0.0 | 0.0 | 0.0 |
| H$_2$O | mol % | 4.250 | 4.250 | 37.499 | 1.649 | 1.649 | 84.844 | 0.306 | 0.000 | 0.000 |
| H$_2$SO$_4$ | mol % | 0.000 | 0.000 | 53.397 | 0.000 | 0.000 | 0.002 | 0.000 | 0.000 | 0.000 |
| CO | ppm | 1995.7 | 1995.7 | 2.8 | 2110.5 | 2110.5 | 0.7 | 2145.3 | 336.2 | 6464.8 |

| Stream | 48 | 52 | 54 | 58 | 60 | S1 | S3 | S4 |
|---|---|---|---|---|---|---|---|---|
| Pressure | 30.00 | 1.01 | 30.00 | 30.00 | 2.00 | 15.00 | 30.00 | 30.00 |
| | (3) | (0.1) | (3) | (3) | (0.2) | (1.5) | (3) | (3) |
| Temperature | 81.63 | 47.64 | 81.63 | 65.00 | 11.81 | 313.72 | 133.04 | 190.03 |
| Flow Rate | 35.0 | 15.7 | 19.6 | 0.1 | 19.6 | 150.6 | 143.8 | 35.0 |
| Ar | 8.825 | 5.659 | 10.698 | 0.000 | 10.700 | 2.711 | 2.867 | 8.825 |
| CO$_2$ | 27.373 | 59.097 | 6.659 | 0.000 | 6.660 | 70.518 | 74.484 | 27.373 |
| N$_2$ | 52.156 | 17.456 | 73.432 | 0.000 | 73.443 | 15.751 | 16.657 | 52.156 |
| NO | 12.0 | 7.7 | 14.6 | 0.0 | 1.5 | 3991.4 | 422.1 | 12.0 |
| NO$_2$ | 108.1 | 69.3 | 131.0 | 0.0 | 28.8 | 1.5 | 722.3 | 108.1 |
| O$_2$ | 11.568 | 15.101 | 9.118 | 0.000 | 9.116 | 4.673 | 3.885 | 11.568 |
| HNO$_3$ | 0.000 | 0.000 | 0.000 | 2.610 | 0.000 | 0.000 | 0.132 | 0.000 |
| SO$_2$ | 0.0 | 0.0 | 0.0 | 0.0 | 0.0 | 14967.6 | 0.0 | 0.0 |
| H$_2$O | 0.000 | 2.638 | 0.000 | 97.390 | 0.000 | 4.250 | 1.649 | 0.000 |
| H$_2$SO$_4$ | 0.000 | 0.000 | 0.000 | 0.000 | 0.000 | 0.000 | 0.000 | 0.000 |
| CO | 648.4 | 415.8 | 786.0 | 0.0 | 786.1 | 1995.7 | 2110.5 | 648.4 |

| Stream | S5 | S6 | S7 | S8 | S9 | S10 | S11 | S12 |
|---|---|---|---|---|---|---|---|---|
| Pressure | 30.00 | 17.00 | 7.00 | 30.00 | 30.00 | 1.01 | 30.00 | 30.00 |
| | (3) | (1.7) | (0.7) | (3) | (3) | (0.1) | (3) | (3) |
| Temperature | 40.00 | 31.15 | 31.15 | 31.15 | 280.00 | 81.63 | 65.00 | 30.00 |
| Flow Rate | 142.3 | 84.3 | 22.9 | 35.0 | 19.6 | 15.5 | 19.6 | 0.1 |
| Ar | 2.924 | 0.417 | 0.573 | 8.799 | 10.700 | 5.812 | 10.700 | 0.000 |
| CO$_2$ | 75.932 | 96.857 | 95.905 | 26.710 | 6.660 | 60.698 | 6.660 | 0.000 |
| N$_2$ | 16.984 | 2.098 | 2.773 | 52.002 | 73.443 | 17.929 | 73.443 | 0.000 |
| NO | 43.0 | 9.2 | 16.3 | 119.7 | 1.5 | 7.9 | 1.5 | 0.0 |
| NO$_2$ | 219.1 | 393.2 | 11.3 | 0.0 | 28.8 | 71.2 | 28.8 | 0.0 |
| O$_2$ | 3.919 | 0.557 | 0.705 | 11.830 | 9.116 | 15.510 | 9.116 | 0.000 |
| HNO$_3$ | 0.000 | 0.000 | 0.000 | 0.000 | 0.000 | 0.000 | 0.000 | 0.000 |
| SO$_2$ | 0.0 | 0.0 | 0.0 | 0.0 | 0.0 | 0.0 | 0.0 | 0.0 |
| H$_2$O | 0.000 | 0.000 | 0.000 | 0.000 | 0.000 | 0.000 | 0.000 | 100.000 |
| H$_2$SO$_4$ | 0.000 | 0.000 | 0.000 | 0.000 | 0.000 | 0.000 | 0.000 | 0.000 |
| CO | 2151.8 | 312.9 | 421.8 | 6464.8 | 786.1 | 427.0 | 786.1 | 0.0 |

TABLE 5

Embodiment of FIG. 4 (without catalyst)

| Stream | — | 8 | 12 | 16 | 18 | 22 | 30 | 40 | 44 | 46 |
|---|---|---|---|---|---|---|---|---|---|---|
| Pressure | Bar | 1.01 | 15.00 | 15.00 | 15.00 | 30.00 | 30.00 | 30.00 | 120.00 | 30.00 |
|  | (MPa) | (0.1) | (1.5) | (1.5) | (1.5) | (3) | (3) | (3) | (12) | (3) |
| Temperature | °C. | 30.09 | 30.00 | 65.00 | 65.00 | 40.00 | 36.55 | 40.00 | 30.00 | 140.00 |
| Flow Rate | kg/s | 150.6 | 150.6 | 6.8 | 143.8 | 143.8 | 1.4 | 142.5 | 107.2 | 35.0 |
| Ar | mol % | 2.711 | 2.711 | 0.005 | 2.867 | 2.867 | 0.002 | 2.915 | 0.450 | 8.799 |
| $CO_2$ | mol % | 70.518 | 70.518 | 3.154 | 74.484 | 74.484 | 0.760 | 75.700 | 96.653 | 26.710 |
| $N_2$ | mol % | 15.751 | 15.751 | 0.013 | 16.657 | 16.657 | 0.004 | 16.932 | 2.243 | 52.002 |
| NO | ppm | 3991.4 | 3991.4 | 0.7 | 422.1 | 422.1 | 0.0 | 42.9 | 10.8 | 119.7 |
| $NO_2$ | ppm | 1.5 | 1.5 | 1275.4 | 722.3 | 722.3 | 362.4 | 218.4 | 311.3 | 0.0 |
| $O_2$ | mol % | 4.673 | 4.673 | 0.011 | 3.885 | 3.885 | 0.002 | 3.907 | 0.588 | 11.830 |
| $HNO_3$ | mol % | 0.000 | 0.000 | 5.794 | 0.132 | 0.132 | 14.350 | 0.000 | 0.000 | 0.000 |
| $SO_2$ | ppm | 14967.6 | 14967.6 | 0.0 | 0.0 | 0.0 | 0.0 | 0.0 | 0.0 | 0.0 |
| $H_2O$ | mol % | 4.250 | 4.250 | 37.499 | 1.649 | 1.649 | 84.844 | 0.306 | 0.000 | 0.000 |
| $H_2SO_4$ | mol % | 0.000 | 0.000 | 53.397 | 0.000 | 0.000 | 0.002 | 0.000 | 0.000 | 0.000 |
| CO | ppm | 1995.7 | 1995.7 | 2.8 | 2110.5 | 2110.5 | 0.7 | 2145.3 | 336.2 | 6464.8 |

| Stream | 48 | 52 | 54 | 58 | 60 | S1 | S3 | S4 |
|---|---|---|---|---|---|---|---|---|
| Pressure | 30.00 | 1.01 | 30.00 | 30.00 | 2.00 | 15.00 | 30.00 | 30.00 |
|  | (3) | (0.1) | (3) | (3) | (0.2) | (1.5) | (3) | (3) |
| Temperature | 31.15 | 12.87 | 31.15 | 65.00 | 11.73 | 313.72 | 133.04 | 140.00 |
| Flow Rate | 35.0 | 15.5 | 19.7 | 0.1 | 19.7 | 150.6 | 143.8 | 35.0 |
| Ar | 8.799 | 5.687 | 10.613 | 0.000 | 10.615 | 2.711 | 2.867 | 8.799 |
| $CO_2$ | 26.710 | 58.126 | 6.465 | 0.000 | 6.466 | 70.518 | 74.484 | 26.710 |
| $N_2$ | 52.002 | 17.544 | 72.849 | 0.000 | 72.864 | 15.751 | 16.657 | 52.002 |
| NO | 119.7 | 77.4 | 144.4 | 0.0 | 14.4 | 3991.4 | 422.1 | 119.7 |
| $NO_2$ | 0.0 | 0.0 | 0.0 | 0.0 | 26.0 | 1.5 | 722.3 | 0.0 |
| $O_2$ | 11.830 | 15.566 | 9.278 | 0.000 | 9.271 | 4.673 | 3.885 | 11.830 |
| $HNO_3$ | 0.000 | 0.000 | 0.000 | 2.376 | 0.000 | 0.000 | 0.132 | 0.000 |
| $SO_2$ | 0.0 | 0.0 | 0.0 | 0.0 | 0.0 | 14967.6 | 0.0 | 0.0 |
| $H_2O$ | 0.000 | 2.651 | 0.000 | 97.624 | 0.000 | 4.250 | 1.649 | 0.000 |
| $H_2SO_4$ | 0.000 | 0.000 | 0.000 | 0.000 | 0.000 | 0.000 | 0.000 | 0.000 |
| CO | 6464.8 | 4178.6 | 7797.6 | 0.0 | 7799.1 | 1995.7 | 2110.5 | 6464.8 |

| Stream | S5 | S6 | S7 | S8 | S9 | S10 | S11 | S12 |
|---|---|---|---|---|---|---|---|---|
| Pressure | 30.00 | 17.00 | 7.00 | 30.00 | 30.00 | 1.01 | 30.00 | 30.00 |
|  | (3) | (1.7) | (0.7) | (3) | (3) | (0.1) | (3) | (3) |
| Temperature | 40.00 | 31.15 | 31.15 | 31.15 | 280.00 | 31.15 | 65.00 | 30.00 |
| Flow Rate | 142.3 | 84.3 | 22.9 | 35.0 | 19.7 | 15.3 | 19.7 | 0.1 |
| Ar | 2.924 | 0.417 | 0.573 | 8.799 | 10.615 | 5.842 | 10.615 | 0.000 |
| $CO_2$ | 75.932 | 96.857 | 95.905 | 26.710 | 6.466 | 59.709 | 6.466 | 0.000 |
| $N_2$ | 16.984 | 2.098 | 2.773 | 52.002 | 72.864 | 18.021 | 72.864 | 0.000 |
| NO | 43.0 | 9.2 | 16.3 | 119.7 | 14.4 | 79.5 | 14.4 | 0.0 |
| $NO_2$ | 219.1 | 393.2 | 11.3 | 0.0 | 26.0 | 0.0 | 26.0 | 0.0 |
| $O_2$ | 3.919 | 0.557 | 0.705 | 11.830 | 9.271 | 15.990 | 9.271 | 0.000 |
| $HNO_3$ | 0.000 | 0.000 | 0.000 | 0.000 | 0.000 | 0.000 | 0.000 | 0.000 |
| $SO_2$ | 0.0 | 0.0 | 0.0 | 0.0 | 0.0 | 0.0 | 0.0 | 0.0 |
| $H_2O$ | 0.000 | 0.000 | 0.000 | 0.000 | 0.000 | 0.000 | 0.000 | 100.000 |
| $H_2SO_4$ | 0.000 | 0.000 | 0.000 | 0.000 | 0.000 | 0.000 | 0.000 | 0.000 |
| CO | 2151.8 | 312.9 | 421.8 | 6464.8 | 7799.1 | 4292.4 | 7799.1 | 0.0 |

TABLE 6

Embodiment of FIG. 5 (with catalyst)

| Stream | — | 8 | 12 | 16 | 18 | 22 | 30 | 40 | 44 | 46 | 48 |
|---|---|---|---|---|---|---|---|---|---|---|---|
| Pressure | Bar | 1.01 | 15.00 | 15.00 | 15.00 | 30.00 | 30.00 | 30.00 | 120.00 | 30.00 | 30.00 |
|  | (MPa) | (0.1) | (1.5) | (1.5) | (1.5) | (3) | (3) | (3) | (12) | (3) | (3) |
| Temperature | °C. | 30.09 | 30.00 | 65.00 | 65.00 | 40.00 | 36.55 | 40.00 | 30.00 | 240.00 | 31.15 |
| Flow Rate | kg/s | 150.6 | 150.6 | 6.8 | 143.8 | 143.8 | 1.4 | 142.5 | 107.2 | 19.7 | 35.0 |
| Ar | mol % | 2.711 | 2.711 | 0.005 | 2.867 | 2.867 | 0.002 | 2.915 | 0.450 | 10.613 | 8.799 |
| $CO_2$ | mol % | 70.518 | 70.518 | 3.154 | 74.484 | 74.484 | 0.760 | 75.700 | 96.653 | 6.465 | 26.710 |
| $N_2$ | mol % | 15.751 | 15.751 | 0.013 | 16.657 | 16.657 | 0.004 | 16.932 | 2.243 | 72.849 | 52.002 |
| NO | ppm | 3991.4 | 3991.4 | 0.7 | 422.1 | 422.1 | 0.0 | 42.9 | 10.8 | 144.4 | 119.7 |
| $NO_2$ | ppm | 1.5 | 1.5 | 1275.4 | 722.3 | 722.3 | 362.4 | 218.4 | 311.3 | 0.0 | 0.0 |
| $O_2$ | mol % | 4.673 | 4.673 | 0.011 | 3.885 | 3.885 | 0.002 | 3.907 | 0.588 | 9.278 | 11.830 |
| $HNO_3$ | mol % | 0.000 | 0.000 | 5.794 | 0.132 | 0.132 | 14.350 | 0.000 | 0.000 | 0.000 | 0.000 |

TABLE 6-continued

Embodiment of FIG. 5 (with catalyst)

| | | | | | | | | | | | |
|---|---|---|---|---|---|---|---|---|---|---|---|
| $SO_2$ | ppm | 14967.6 | 14967.6 | 0.0 | 0.0 | 0.0 | 0.0 | 0.0 | 0.0 | 0.0 | 0.0 |
| $H_2O$ | mol % | 4.250 | 4.250 | 37.499 | 1.649 | 1.649 | 84.844 | 0.306 | 0.000 | 0.000 | 0.000 |
| $H_2SO_4$ | mol % | 0.000 | 0.000 | 53.397 | 0.000 | 0.000 | 0.002 | 0.000 | 0.000 | 0.000 | 0.000 |
| CO | ppm | 1995.7 | 1995.7 | 2.8 | 2110.5 | 2110.5 | 0.7 | 2145.3 | 336.2 | 7797.6 | 6464.8 |

| | Stream | 52 | 54 | 60 | S1 | S3 | S4 | S5 | S6 | S7 | S10 |
|---|---|---|---|---|---|---|---|---|---|---|---|
| | Pressure | 1.01 | 30.00 | 2.00 | 15.00 | 30.00 | 30.00 | 30.00 | 17.00 | 7.00 | 1.01 |
| | | (0.1) | (3) | (0.2) | (1.5) | (3) | (3) | (3) | (1.7) | (0.7) | (0.1) |
| | Temperature | 12.87 | 31.15 | 26.26 | 313.72 | 133.04 | 305.69 | 40.00 | 31.15 | 31.15 | 31.15 |
| | Flow Rate | 15.5 | 19.7 | 19.7 | 150.6 | 143.8 | 19.7 | 142.3 | 84.3 | 22.9 | 15.3 |
| | Ar | 5.687 | 10.613 | 10.651 | 2.711 | 2.867 | 10.651 | 2.924 | 0.417 | 0.573 | 5.842 |
| | $CO_2$ | 58.126 | 6.465 | 7.192 | 70.518 | 74.484 | 7.192 | 75.932 | 96.857 | 95.905 | 59.709 |
| | $N_2$ | 17.544 | 72.849 | 73.111 | 15.751 | 16.657 | 73.111 | 16.984 | 2.098 | 2.773 | 18.021 |
| | NO | 77.4 | 144.4 | 14.5 | 3991.4 | 422.1 | 14.5 | 43.0 | 9.2 | 16.3 | 79.5 |
| | $NO_2$ | 0.0 | 0.0 | 130.5 | 1.5 | 722.3 | 130.5 | 219.1 | 393.2 | 11.3 | 0.0 |
| | $O_2$ | 15.566 | 9.278 | 8.953 | 4.673 | 3.885 | 8.953 | 3.919 | 0.557 | 0.705 | 15.990 |
| | $HNO_3$ | 0.000 | 0.000 | 0.000 | 0.000 | 0.132 | 0.000 | 0.000 | 0.000 | 0.000 | 0.000 |
| | $SO_2$ | 0.0 | 0.0 | 0.0 | 14967.6 | 0.0 | 0.0 | 0.0 | 0.0 | 0.0 | 0.0 |
| | $H_2O$ | 2.651 | 0.000 | 0.000 | 4.250 | 1.649 | 0.000 | 0.000 | 0.000 | 0.000 | 0.000 |
| | $H_2SO_4$ | 0.000 | 0.000 | 0.000 | 0.000 | 0.000 | 0.000 | 0.000 | 0.000 | 0.000 | 0.000 |
| | CO | 4178.6 | 7797.6 | 782.6 | 1995.7 | 2110.5 | 782.6 | 2151.8 | 312.9 | 421.8 | 4292.4 |

TABLE 7

Embodiment of FIG. 5 (without catalyst)

| Stream | | — | 8 | 12 | 16 | 18 | 22 | 30 | 40 | 44 | 46 | 48 |
|---|---|---|---|---|---|---|---|---|---|---|---|---|
| Pressure | Bar | 1.01 | 15.00 | 15.00 | 15.00 | 30.00 | 30.00 | 30.00 | 120.00 | 30.00 | 30.00 | |
| | (MPa) | (0.1) | (1.5) | (1.5) | (1.5) | (3) | (3) | (3) | (12) | (3) | (3) | |
| Temperature | °C. | 30.09 | 30.00 | 65.00 | 65.00 | 40.00 | 36.55 | 40.00 | 30.00 | 240.00 | 31.15 | |
| Flow Rate | kg/s | 150.6 | 150.6 | 6.8 | 143.8 | 143.8 | 1.4 | 142.5 | 107.2 | 19.7 | 35.0 | |
| Ar | mol % | 2.711 | 2.711 | 0.005 | 2.867 | 2.867 | 0.002 | 2.915 | 0.450 | 10.613 | 8.799 | |
| $CO_2$ | mol % | 70.518 | 70.518 | 3.154 | 74.484 | 74.484 | 0.760 | 75.700 | 96.653 | 6.465 | 26.710 | |
| $N_2$ | mol % | 15.751 | 15.751 | 0.013 | 16.657 | 16.657 | 0.004 | 16.932 | 2.243 | 72.849 | 52.002 | |
| NO | ppm | 3991.4 | 3991.4 | 0.7 | 422.1 | 422.1 | 0.0 | 42.9 | 10.8 | 144.4 | 119.7 | |
| $NO_2$ | ppm | 1.5 | 1.5 | 1275.4 | 722.3 | 722.3 | 362.4 | 218.4 | 311.3 | 0.0 | 0.0 | |
| $O_2$ | mol % | 4.673 | 4.673 | 0.011 | 3.885 | 3.885 | 0.002 | 3.907 | 0.588 | 9.278 | 11.830 | |
| $HNO_3$ | mol % | 0.000 | 0.000 | 5.794 | 0.132 | 0.132 | 14.350 | 0.000 | 0.000 | 0.000 | 0.000 | |
| $SO_2$ | ppm | 14967.6 | 14967.6 | 0.0 | 0.0 | 0.0 | 0.0 | 0.0 | 0.0 | 0.0 | 0.0 | |
| $H_2O$ | mol % | 4.250 | 4.250 | 37.499 | 1.649 | 1.649 | 84.844 | 0.306 | 0.000 | 0.000 | 0.000 | |
| $H_2SO_4$ | mol % | 0.000 | 0.000 | 53.397 | 0.000 | 0.000 | 0.002 | 0.000 | 0.000 | 0.000 | 0.000 | |
| CO | ppm | 1995.7 | 1995.7 | 2.8 | 2110.5 | 2110.5 | 0.7 | 2145.3 | 336.2 | 7797.6 | 6464.8 | |

| | Stream | 52 | 54 | 60 | S1 | S3 | S4 | S5 | S6 | S7 | S10 |
|---|---|---|---|---|---|---|---|---|---|---|---|
| | Pressure | 1.01 | 30.00 | 2.00 | 15.00 | 30.00 | 30.00 | 30.00 | 17.00 | 7.00 | 1.01 |
| | | (0.1) | (3) | (0.2) | (1.5) | (3) | (3) | (3) | (1.7) | (0.7) | (0.1) |
| | Temperature | 12.87 | 31.15 | −9.94 | 313.72 | 133.04 | 240.00 | 40.00 | 31.15 | 31.15 | 31.15 |
| | Flow Rate | 15.5 | 19.7 | 19.7 | 150.6 | 143.8 | 19.7 | 142.3 | 84.3 | 22.9 | 15.3 |
| | Ar | 5.687 | 10.613 | 10.613 | 2.711 | 2.867 | 10.613 | 2.924 | 0.417 | 0.573 | 5.842 |
| | $CO_2$ | 58.126 | 6.465 | 6.465 | 70.518 | 74.484 | 6.465 | 75.932 | 96.857 | 95.905 | 59.709 |
| | $N_2$ | 17.544 | 72.849 | 72.849 | 15.751 | 16.657 | 72.849 | 16.984 | 2.098 | 2.773 | 18.021 |
| | NO | 77.4 | 144.4 | 144.4 | 3991.4 | 422.1 | 144.4 | 43.0 | 9.2 | 16.3 | 79.5 |
| | $NO_2$ | 0.0 | 0.0 | 0.0 | 1.5 | 722.3 | 0.0 | 219.1 | 393.2 | 11.3 | 0.0 |
| | $O_2$ | 15.566 | 9.278 | 9.278 | 4.673 | 3.885 | 9.278 | 3.919 | 0.557 | 0.705 | 15.990 |
| | $HNO_3$ | 0.000 | 0.000 | 0.000 | 0.000 | 0.132 | 0.000 | 0.000 | 0.000 | 0.000 | 0.000 |
| | $SO_2$ | 0.0 | 0.0 | 0.0 | 14967.6 | 0.0 | 0.0 | 0.0 | 0.0 | 0.0 | 0.0 |
| | $H_2O$ | 2.651 | 0.000 | 0.000 | 4.250 | 1.649 | 0.000 | 0.000 | 0.000 | 0.000 | 0.000 |
| | $H_2SO_4$ | 0.000 | 0.000 | 0.000 | 0.000 | 0.000 | 0.000 | 0.000 | 0.000 | 0.000 | 0.000 |
| | CO | 4178.6 | 7797.6 | 7797.6 | 1995.7 | 2110.5 | 7797.6 | 2151.8 | 312.9 | 421.8 | 4292.4 |

The results indicate that the present invention can significantly reduce not only the emission concentration of CO and $NO_x$, but also the total amount of CO and $NO_x$ that would be released into the atmosphere, while also maintaining the production of a liquid carbon dioxide product having a purity of about 97% carbon dioxide.

It will be appreciated that the invention is not restricted to the details described above with reference to the preferred embodiments but that numerous modifications and variations can be made without departing form the spirit or scope of the invention as defined in the following claims.

The invention claimed is:
1. A method for removing carbon monoxide (CO) from flue gas comprising carbon dioxide, CO and at least one non-condensable gas, said method comprising:
generating said flue gas by oxyfuel combustion of a fuel in an oxyfuel combustion system;
contacting said flue gas, or a CO-containing gas derived therefrom, at a first elevated temperature and at a first elevated pressure, with at least one catalyst bed comprising a CO-oxidation catalyst in the presence of oxygen ($O_2$) to convert CO to carbon dioxide and produce carbon dioxide-enriched gas comprising at least a portion of said non-condensable gas(es);

recovering carbon dioxide from said carbon dioxide-enriched gas, or from a carbon dioxide-containing gas derived therefrom, to produce recovered carbon dioxide and carbon dioxide-depleted gas comprising at least a portion of said non-condensable gas(es).

2. The method of claim 1, wherein said first elevated temperature is at least 80° C.

3. The method of claim 1, wherein heat is recovered from said carbon dioxide-enriched gas by indirect heat exchange with said flue gas, or said CO-containing gas derived therefrom, as feed to said catalyst bed(s).

4. The method of claim 1, wherein said first elevated pressure is at least 2 bar (0.2 MPa).

5. The method of claim 1, wherein said flue gas is generated at a pressure that is lower than said first elevated pressure, said method comprising compressing said flue gas to said first elevated pressure.

6. The method of claim 1, wherein carbon dioxide is recovered from said carbon dioxide-enriched gas, or from said carbon dioxide-containing gas derived therefrom, by a process selected from the group consisting of low temperature carbon dioxide purification involving condensation or liquefaction of carbon dioxide to produce said recovered carbon dioxide as a liquid; membrane separation; and any combination thereof.

7. The method of claim 1, wherein at least a portion of said carbon dioxide is recovered from said carbon dioxide-enriched gas, or from said carbon dioxide-containing gas derived therefrom, by membrane separation, said method comprising:

separating said carbon dioxide-enriched gas, or said carbon dioxide-containing gas derived therefrom, in a membrane separation system into a carbon dioxide-rich permeate fraction and a non-condensable gas(es)-enriched retentate fraction; and recycling said carbon dioxide-rich permeate fraction, or a carbon dioxide-rich gas derived therefrom, to said oxyfuel combustion system.

8. The method of claim 7, wherein said carbon dioxide-rich permeate fraction is used to regenerate at least one adsorbent bed prior to being recycled to said oxyfuel combustion system.

9. The method of claim 8, wherein said adsorbent bed(s) is part of an integrated low temperature carbon dioxide purification system involving condensation or liquefaction of carbon dioxide to produce recovered carbon dioxide as a liquid.

10. The method of claim 7, wherein said carbon dioxide-enriched gas, or said carbon dioxide-containing gas derived therefrom, comprises at least one additional gas selected from the group consisting of $O_2$ and $NO_x$, and wherein said carbon dioxide-rich permeate fraction comprises at least a portion of said additional gas(es).

11. The method of claim 1, wherein said flue gas, or said CO-containing gas derived therefrom, comprises nitric oxide (NO) and wherein said catalyst bed(s) oxidizes NO to nitrogen dioxide ($NO_2$) in the presence of $O_2$, said carbon dioxide-enriched gas thereby also being enriched with $NO_2$.

12. The method of claim 11, wherein $NO_2$ is removed from said carbon dioxide-enriched gas, or from a $NO_2$-containing gas derived therefrom, by a process selected from the group consisting of: adsorption; conversion to nitric acid condensate; membrane separation; distillation; and any combination of two or more of said processes.

13. The method of claim 11, wherein at least a portion $NO_2$ is removed from said carbon dioxide-enriched gas, or from a $NO_2$-containing gas derived therefrom, by adsorption, said method comprising:

adsorbing $NO_2$ in at least one adsorbent bed to produce $NO_2$-depleted gas;

regenerating said adsorbent bed(s) using a regeneration gas to produce $NO_2$-enriched regeneration gas; and recycling said $NO_2$-enriched regeneration gas to said oxyfuel combustion system.

14. The method of claim 1, wherein said flue gas is contacted with said catalyst bed(s), and CO in said flue gas is converted to carbon dioxide to produce said carbon dioxide-enriched gas.

15. The method of claim 14, wherein carbon dioxide is recovered from said carbon dioxide-enriched gas, or from a carbon dioxide-containing gas derived therefrom, by low temperature carbon dioxide purification involving condensation or liquefaction of carbon dioxide to produce said recovered carbon dioxide as a liquid and said carbon dioxide-depleted gas.

16. The method of claim 14, wherein said flue gas comprises NO, and said catalyst bed(s) oxidizes NO to $NO_2$ to produce carbon dioxide-enriched gas that is enriched with $NO_2$, said method comprising removing $NO_2$ from said carbon dioxide-enriched gas to produce said carbon dioxide-containing gas that is at least lean in $NO_2$.

17. The method of claim 1, said method comprising recovering carbon dioxide from said flue gas by low temperature carbon dioxide purification involving condensation or liquefaction of carbon dioxide to produce recovered carbon dioxide as a liquid and said CO-containing gas which is depleted in carbon dioxide, wherein said CO-containing gas is contacted with said catalyst bed(s), and CO in said CO-containing gas is converted to carbon dioxide to produce said carbon dioxide-enriched gas.

18. The method of claim 17, wherein carbon dioxide is recovered from said carbon dioxide-enriched gas in a membrane separation system that produces a carbon dioxide-rich permeate fraction as said recovered carbon dioxide and a non-condensable gas(es)-enriched retentate fraction as said carbon dioxide-depleted gas; said method comprising:

recycling said carbon dioxide-rich permeate fraction to said oxyfuel combustion system, optionally after being used to regenerate at least one adsorbent bed.

19. The method of claim 17, wherein said CO-containing gas comprises NO, and said catalyst bed(s) oxidizes NO to $NO_2$ to produce said carbon dioxide-enriched gas that is enriched with $NO_2$, said method comprising removing $NO_2$ from said carbon dioxide-enriched gas, or from a non-condensable gas(es)-enriched gas derived therefrom that comprises $NO_2$, to produce residual gas that is at least lean in $NO_2$.

20. The method of claim 1, wherein said flue gas, or said CO-containing gas derived therefrom, comprises NO and wherein said catalyst bed(s) reduces NO to nitrogen ($N_2$) in the presence of a reducing gas, said carbon dioxide-enriched gas thereby also being enriched with $N_2$.

21. The method of claim 1, wherein said flue gas comprises $SO_x$, said method comprising removing $SO_x$ from said flue gas prior to contacting said flue gas, or said CO-containing gas derived therefrom, with said catalyst bed(s).

22. A method for removing carbon monoxide (CO) and $NO_x$ from flue gas comprising carbon dioxide, CO, $NO_x$ and at least one non-condensable gas, said method comprising:

generating said flue gas by oxyfuel combustion of a fuel in an oxyfuel combustion system;

contacting said flue gas, or a CO-containing gas derived therefrom comprising nitric oxide (NO), at a first elevated temperature and at a first elevated pressure, with at least one catalyst bed comprising a CO-oxidation catalyst in the presence of oxygen ($O_2$) to convert CO and NO to carbon dioxide and nitrogen dioxide ($NO_2$) respectively and produce carbon dioxide-enriched gas comprising at least a portion of said condensable gas(es) and enriched in $NO_2$;

removing at least a portion of said $NO_2$ from said carbon dioxide-enriched gas, or from a $NO_2$-containing gas derived therefrom, by adsorbing $NO_2$ in at least one adsorbent bed to produce $NO_2$-depleted gas;

regenerating said adsorbent bed(s) using a regeneration gas to produce $NO_2$-enriched regeneration gas; and recycling said $NO_2$-enriched regeneration gas to said oxyfuel combustion system.

* * * * *